US012764670B2

(12) United States Patent
Zhang et al.

(10) Patent No.: US 12,764,670 B2
(45) Date of Patent: Oct. 13, 2026

(54) UPLINK TRANSMIT POWER DETERMINING METHOD AND TERMINAL DEVICE

(71) Applicant: HUAWEI TECHNOLOGIES CO., LTD., Shenzhen (CN)

(72) Inventors: Lei Zhang, Shenzhen (CN); Yiqun Wu, Boulogne Billancourt (FR); Zhengwei Gong, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 18/733,176

(22) Filed: Jun. 4, 2024

(65) Prior Publication Data

US 2024/0323860 A1 Sep. 26, 2024

Related U.S. Application Data

(63) Continuation of application No. 17/402,020, filed on Aug. 13, 2021, now Pat. No. 12,075,360, which is a (Continued)

(30) Foreign Application Priority Data

Feb. 15, 2019 (CN) ......................... 201910118212.2
Apr. 29, 2019 (CN) ......................... 201910355783.8
(Continued)

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC ............ H04W 52/146; H04W 52/367; H04W 52/281; H04W 52/325; H04W 52/50;
(Continued)

(56) References Cited

U.S. PATENT DOCUMENTS 10,932,207 B2 2/2021 Suzuki et al.
11,647,543 B2 * 5/2023 Dinan .............. H04W 74/0833 370/329
(Continued)

FOREIGN PATENT DOCUMENTS

CN 104936275 A 9/2015
CN 106961721 A 7/2017
(Continued)

OTHER PUBLICATIONS

3GPP TS 38.300 V15.4.0, 3rd Generation Partnership Project; Technical Specification Group Radio Access Network; NR; NR and NG-RAN Overall Description; Stage 2 (Release 15), Dec. 2018, 97 pages.
(Continued)

*Primary Examiner* — Fayyaz Alam
(74) *Attorney, Agent, or Firm* — Fish & Richardson P.C.

(57) ABSTRACT

This application provides example uplink transmit power determining methods and example terminal devices. One example method includes: determining a total transmit power of a first plurality of uplink signals located in a first time domain resource, wherein the first plurality of uplink signals include MsgA PRACH; and when the total transmit power of the first plurality of uplink signals exceeds a maximum transmit power of a terminal device, determining a transmit power of the MsgA PRACH based on a power priority of the MsgA PRACH, wherein the power priority of the MsgA PRACH is same as a power priority of Msg 1 PRACH in a primary cell.

10 Claims, 4 Drawing Sheets

Related U.S. Application Data continuation of application No. PCT/CN2020/075411, filed on Feb. 14, 2020.

(30) Foreign Application Priority Data

May 15, 2019 (CN) ......................... 201910403826.5
Nov. 8, 2019 (CN) ......................... 201911089995.2

(58) Field of Classification Search
CPC ............. H04W 74/004; H04W 52/262; H04W 52/327; H04W 52/18
See application file for complete search history.

(56) References Cited

U.S. PATENT DOCUMENTS

| | | | |
|---|---|---|---|
| 2004/0082356 | A1 | 4/2004 | Walton et al. |
| 2013/0058315 | A1 | 3/2013 | Feuersanger et al. |
| 2013/0308575 | A1 | 11/2013 | Chen et al. |
| 2016/0316435 | A1 | 10/2016 | Guo et al. |
| 2017/0230913 | A1 | 8/2017 | Ouchi et al. |
| 2018/0279376 | A1 | 9/2018 | Dinan et al. |
| 2019/0349061 | A1* | 11/2019 | Cirik ..................... H04L 1/0026 |
| 2020/0068500 | A1 | 2/2020 | Liu et al. |
| 2020/0178180 | A1 | 6/2020 | Zhang et al. |
| 2020/0260341 | A1* | 8/2020 | Jang .................. H04W 36/0064 |
| 2021/0068058 | A1 | 3/2021 | Sun et al. |
| 2021/0289561 | A1 | 9/2021 | Liu et al. |
| 2021/0329571 | A1 | 10/2021 | Yu et al. |
| 2022/0174610 | A1 | 6/2022 | Qiao et al. |

FOREIGN PATENT DOCUMENTS

| | | | |
|---|---|---|---|
| CN | 109151979 | A | 1/2019 |
| CN | 109314931 | A | 2/2019 |
| EP | 3585112 | A1 | 12/2019 |
| WO | 2017121408 | A1 | 7/2017 |
| WO | 2018151230 | A1 | 8/2018 |
| WO | 2018171704 | A1 | 9/2018 |
| WO | 2018175809 | A1 | 9/2018 |
| WO | 2020222690 | A1 | 11/2020 |

OTHER PUBLICATIONS

Zte et al., "Remaining issues of 2-step RACH procedures," 3GPP TSG RAN WG1 Meeting #98bis, R1-1910003, Chongqing, China, Oct. 14-20, 2019, 19 pages.

Extended European Search Report in European Appln. No. 25205669.2, mailed on Mar. 19, 2026, 9 pages.

3GPP TS 38.213 V15.4.0 (Dec. 2018), "3rd Generation Partnership Project; Technical Specification Group Radio Access Network; NR; Physical layer procedures for control(Release 15)," Dec. 2018, 104 pages.

3GPP TS 38.331 V15.4.0 (Dec. 2018), "3rd Generation Partnership Project; Technical Specification Group Radio Access Network; NR, Radio Resource Control (RRC) protocol specification(Release 15)," Dec. 2018, 474 pages.

Extended European Search Report issued in European Application No. 20755947.7 on Feb. 23, 2022, 8 pages.

Huawei, HiSilicon, "General discussion of UL power control for NR," 3GPP TSG RAN WG1 NR Ad Hoc Meeting, R1-1700063, Spokane, USA, Jan. 16-20, 2017, 4 pages.

Office Action in Canadian Appln. No. 3,130,418, mailed on Aug. 30, 2023, 4 pages.

Office Action issued in Chinese Application No. 201911089995.2 on Nov. 1, 2021, 10 pages.

PCT International Search Report and Written Opinion issued in International Application No. PCT/CN2020/075411 on May 15, 2020, 13 pages (with English translation).

Zte et al., "Offline summary for AI 6.7 NR UL power control," 3GPP TSG RAN WG1 Meeting NR#3, R1-1716761, Nagoya, Japan, Sep. 18-21, 2017, 9 pages.

* cited by examiner

UPLINK TRANSMIT POWER DETERMINING METHOD AND TERMINAL DEVICE

CROSS-REFERENCE TO RELATED APPLICATIONS

This application is a continuation of U.S. patent application Ser. No. 17/402,020, filed on Aug. 13, 2021, which is a continuation of International Application No. PCT/CN2020/075411, filed on Feb. 14, 2020, which claims priority to Chinese Patent Application No. 201910118212.2, filed on Feb. 15, 2019 and Chinese Patent Application No. 201910355783.8, filed on Apr. 29, 2019 and Chinese Patent Application No. 201910403826.5, filed on May 15, 2019 and Chinese Patent Application No. 201911089995.2, filed on Nov. 8, 2019. All of the aforementioned patent applications are hereby incorporated by reference in their entireties.

TECHNICAL FIELD

This application relates to the field of communication technologies, and more specifically, to an uplink transmit power determining method and a terminal device.

BACKGROUND

In a wireless communication system, to establish a connection to a network, user equipment performs a random access procedure with an access network device. In some communication systems (for example, long term evolution (LTE)), a random access procedure is a four-step random access procedure. FIG. 1 is a schematic flowchart of a four-step random access procedure.

101. A terminal device sends a message 1 (Msg 1) to an access network device. The Msg 1 carries a random access preamble.

102. The access network device sends a message 2 (Msg 2) to the terminal device. Specifically, the access network device may determine the Msg 2 based on the received random access preamble. The Msg 2 includes a random access response (RAR). The RAR may include information such as a network temporary identifier and a timing advance that are allocated by the access network device to the terminal device.

103. The terminal device sends a message 3 (Msg 3) to the access network device. Specifically, the terminal device may send the Msg 3 to the access network device on a time-frequency resource configured in the RAR. Data carried in the Msg 3 may include an identifier of the terminal device, random access data, and the like. The random access data is used by the access network device to determine whether the terminal device successfully performs random access.

104. The access network device determines, based on the random access data, whether the terminal device successfully performs random access. If determining that the terminal device successfully performs random access, the access network device may send a message 4 (Msg 4) to the terminal device. The Msg 4 may also be referred to as a conflict resolution message, and is used to indicate that the terminal device completes a random access procedure.

To reduce a delay caused by multi-step interaction between the terminal device and the access network device in the four-step random access procedure, the industry proposes a two-step random access procedure. FIG. 2 is a schematic diagram of a two-step random access procedure.

201. A terminal device sends a message A (Msg A) to an access network device, where the Msg A may include content of the Msg 1 and the Msg 3 that are sent by the terminal device to the access network device in the four-step random access procedure. For example, the Msg A may include a random access preamble and data.

202. The access network device sends a message B (Msg B) to the terminal device, where the Msg B may include content of the Msg 2 and the Msg 4 that are sent by the access network device to the terminal device in the four-step random access procedure.

Uplink power control in the wireless communication system is very important, but currently, no uplink power control solution for the two-step random access procedure is proposed.

SUMMARY

This application provides an uplink transmit power determining method and a terminal device, to determine an MCS compensation factor based on cell-level first power control information.

According to a first aspect, an embodiment of this application provides an uplink transmit power determining method, including: receiving, by a terminal device, a broadcast message that is sent by an access network device and that carries first power control information, where the first power control information is used to determine an MCS compensation factor; determining, by the terminal device, the MCS compensation factor based on the first power control information; determining, by the terminal device, a first candidate uplink transmit power based on the MCS compensation factor; determining, by the terminal device, a smaller value in the first candidate uplink transmit power and a second candidate uplink transmit power as a physical uplink shared channel PUSCH transmit power, where the second candidate uplink transmit power is determined based on a maximum transmit power that can be used by the terminal device; and sending, by the terminal device, PUSCH information in a random access message based on the PUSCH transmit power. In the foregoing technical solution, the first power control information that is obtained by the terminal device and that is used to determine the MCS compensation factor is sent by the access network device in a broadcast manner. Therefore, in addition to the terminal device, another terminal device that is in a same cell as the terminal device can also receive the same first power control information. In other words, the access network device configures the same first power control information for all terminal devices in the cell.

With reference to the first aspect, in a possible implementation of the first aspect, the method further includes: receiving, by the terminal device, a first power offset parameter and a second power offset parameter that are sent by the access network device; and determining, by the terminal device, a target power based on the first power offset parameter or the second power offset parameter; and the determining, by the terminal device, a first candidate uplink transmit power based on the MCS compensation factor includes: determining, by the terminal device, the first candidate uplink transmit power based on the target power and the MCS compensation factor. In the foregoing technical solution, different power offset parameters are considered, and a corresponding power offset parameter is selected according to a requirement to compensate for the first candidate uplink transmit power. Therefore, in the foregoing technical solution, impact of different transmission scenarios on system performance is considered.

With reference to the first aspect, in a possible implementation of the first aspect, the determining, by the terminal device, the first candidate uplink transmit power based on the target power and the MCS compensation factor includes: determining, by the terminal device, the first candidate uplink transmit power based on the target power, the MCS compensation factor, and at least one of a bandwidth adjustment amount, a path loss adjustment amount, and a power control adjustment amount.

With reference to the first aspect, in a possible implementation of the first aspect, the determining, by the terminal device, the first candidate uplink transmit power based on the target power, the MCS compensation factor, and at least one of a bandwidth adjustment amount, a path loss adjustment amount, and a power control adjustment amount includes: determining, by the terminal device, the first candidate uplink transmit power according to the following formula:

$$P_{Can,b,f,c}(i,j) = P_{O_{PUSCH},b,f,c}(j) + 10\log_{10}\left(2^{\mu}\cdot M_{RB,b,f,c}^{PUSCH}(i)\right) + \alpha_{b,f,c}(j)\cdot PL_{b,f,c} + \Delta_{TF,b,f,c}(i) + f_{b,f,c}(i)$$

where $P_{Can,b,f,c}(i, j)$ represents the first candidate uplink transmit power, $P_{O_{PUSCH},b,f,c}(j)$ represents the target power, $$M_{RB,b,f,c}^{PUSCH}(i)$$

represents a transmission bandwidth that is of a PUSCH and that is allocated to the terminal device, $\Delta_{b,f,c}(j)$ represents a path loss compensation factor, $PL_{b,f,c}$ represents an estimated path loss, $\Delta_{TF,b,f,c}(i)$ represents the MCS compensation factor, $f_{b,f,c}(i)$ represents the power control adjustment amount, b represents a bandwidth part sequence number, f represents a carrier sequence number, c represents a sequence number of a serving cell of the terminal device, j represents a configuration index, i represents a transmission time unit sequence number, and μ is used to indicate different subcarrier spacing sequence numbers.

With reference to the first aspect, in a possible implementation of the first aspect, when the random access message is sent for the first time, the power control adjustment amount is 0. In the foregoing technical solution, the corresponding power control adjustment amount is designed for transmitting the random access message for the first time.

With reference to the first aspect, in a possible implementation of the first aspect, the method further includes: when the random access message is sent in a retransmission manner and the random access message further includes a random access preamble, determining the power control adjustment amount based on a target-power ramp step and a quantity of times that the random access message has been retransmitted, where the target-power ramp step is a random access preamble power ramp step or a PUSCH power ramp step. In the foregoing technical solution, a corresponding power control adjustment amount determining method is designed for retransmitting the random access message. More specifically, in the foregoing technical solution, the corresponding power control adjustment amount determining method is designed for retransmitting the random access preamble and the PUSCH information.

With reference to the first aspect, in a possible implementation of the first aspect, the method further includes: when the random access message is sent in a retransmission manner and the random access message does not include a random access preamble, determining, by the terminal device, an initial power control adjustment amount based on a target-power ramp step and a quantity of times that the random access preamble in the random access message has been retransmitted or a quantity of times that the PUSCH information has been retransmitted, where the target-power ramp step is a random access preamble power ramp step or a PUSCH power ramp step; and determining the power control adjustment amount based on the initial power control adjustment amount and transmit power adjustment indication information carried in a random access response. In the foregoing technical solution, a corresponding power control adjustment amount determining method is designed for retransmitting the random access message. More specifically, in the foregoing technical solution, the corresponding power control adjustment amount determining method is designed for retransmitting only the PUSCH information.

With reference to the first aspect, in a possible implementation of the first aspect, the determining, by the terminal device, a target power based on the first power offset parameter or the second power offset parameter includes: when the random access message includes only the PUSCH information, determining, by the terminal device, the target power based on the first power offset parameter and an initial target power; or when the random access message includes the PUSCH information and the random access preamble, determining, by the terminal device, the target power based on the second power offset parameter and the initial target power. According to the foregoing technical solution, when sending random access messages carrying different content, the terminal device may select corresponding power offset parameters to compensate for the first candidate uplink transmit power. Therefore, in the foregoing technical solution, impact of different transmission scenarios on system performance is considered.

With reference to the first aspect, in a possible implementation of the first aspect, the second candidate uplink transmit power is the maximum transmit power of the terminal device.

With reference to the first aspect, in a possible implementation of the first aspect, the second candidate uplink transmit power is a difference between the maximum transmit power of the terminal device and a random access preamble transmit power; and the method further includes: sending, by the terminal device, the random access preamble in the random access message based on the random access preamble transmit power, where a frequency domain resource used to send the random access preamble in the random access message is different from a frequency domain resource used to send the PUSCH information in the random access message. In the foregoing technical solution, how to determine, in a case of frequency division multiplexing, a transmit power used to send the random access preamble and a transmit power used to send the PUSCH information is considered, to prevent a total transmit power from exceeding a predetermined threshold.

With reference to the first aspect, in a possible implementation of the first aspect, the terminal device determines a first initial target power and a first power ramp step depending on whether a time-frequency resource (a first time-frequency resource) used to send the random access preamble in the random access message is a random access channel time-frequency resource used in both a two-step random access procedure and a four-step random access procedure, where the first initial target power is an initial target power used to send a random access preamble in the two-step random access procedure, and the first power ramp step is a random access preamble power ramp step in the two-step random access procedure.

With reference to the first aspect, in a possible implementation of the first aspect, that the terminal device determines a first initial target power and a first power ramp step depending on whether a first time-frequency resource is a random access channel time-frequency resource used in both a two-step random access procedure and a four-step random access procedure includes: When determining that the first time-frequency resource is the random access channel time-frequency resource used in both the two-step random access procedure and the four-step random access procedure, the terminal device determines that the first initial target power is the same as an initial target power used to send a random access preamble in the four-step random access procedure, and/or the first power ramp step is the same as a random access preamble power ramp step in the four-step random access procedure.

With reference to the first aspect, in a possible implementation of the first aspect, the method further includes: receiving, by the terminal device, an initial target power offset value and a power ramp step offset value that are sent by the access network device. That the terminal device determines a first initial target power and a first power ramp step depending on whether a first time-frequency resource is a random access channel time-frequency resource used in both a two-step random access procedure and a four-step random access procedure includes: When determining that the first time-frequency resource is not the random access channel time-frequency resource used in both the two-step random access procedure and the four-step random access procedure, the terminal device determines the first initial target power based on the initial target power offset value and an initial target power used to send a random access preamble in the four-step random access procedure, and/or determines the first power ramp step based on the power ramp step offset value and a random access preamble power ramp step in the four-step random access procedure.

With reference to the first aspect, in a possible implementation of the first aspect, the method further includes: receiving, by the terminal device, a reference initial target power and a reference power ramp step that are sent by the access network device and that are used to transmit the random access preamble in the two-step random access procedure. That the terminal device determines a first initial target power and a first power ramp step depending on whether a first time-frequency resource is a random access channel time-frequency resource used in both a two-step random access procedure and a four-step random access procedure includes: When determining that the first time-frequency resource is not the random access channel time-frequency resource used in both the two-step random access procedure and the four-step random access procedure, the terminal device determines that the first initial target power is the reference initial target power, and determines that the first power ramp step is the reference power ramp step.

With reference to the first aspect, in a possible implementation of the first aspect, the method further includes: determining, by the terminal device depending on whether the first time-frequency resource is the random access channel time-frequency resource used in both the two-step random access procedure and the four-step random access procedure, a first power control parameter used to send the PUSCH information, where the first power control parameter includes at least one of the following parameters: a path loss compensation factor, the MCS compensation factor, and a power offset between the PUSCH information in the random access message and the random access preamble in the random access message.

With reference to the first aspect, in a possible implementation of the first aspect, the determining, by the terminal device depending on whether the first time-frequency resource is the random access channel time-frequency resource used in both the two-step random access procedure and the four-step random access procedure, a first power control parameter includes: when determining that the first time-frequency resource is the random access channel time-frequency resource used in both the two-step random access procedure and the four-step random access procedure, determining, by the terminal device, that the path loss compensation factor is the same as a path loss compensation factor in a message 3 in the four-step random access procedure; determining that the MCS compensation factor is the same as an MCS compensation factor in the four-step random access procedure; and/or determining that the power offset between the PUSCH information in the random access message and the random access preamble in the random access message is the same as a power offset between the random access preamble and the message 3 in the four-step random access procedure.

With reference to the first aspect, in a possible implementation of the first aspect, the method further includes: receiving, by the terminal device, a path loss compensation factor offset value and a power offset correction value that are sent by the access network device. The determining, by the terminal device, a first power control parameter depending on whether the first time-frequency resource is a random access channel time-frequency resource used in both the two-step random access procedure and the four-step random access procedure includes: when determining that the first time-frequency resource is not the random access channel time-frequency resource used in both the two-step random access procedure and the four-step random access procedure, determining, by the terminal device, the path loss compensation factor based on the path loss compensation factor offset value and a path loss compensation factor in a message 3 in the four-step random access procedure, and determining the power offset between the PUSCH information in the random access message and the random access preamble in the random access message based on the power offset correction value and a power offset between the random access preamble and the message 3 in the four-step random access procedure.

With reference to the first aspect, in a possible implementation of the first aspect, the method further includes: receiving, by the terminal device, a reference path loss compensation factor and a reference power offset that are sent by the access network device and that are used to send a PUSCH in the two-step random access procedure. The determining, by the terminal device depending on whether the first time-frequency resource is the random access channel time-frequency resource used in both the two-step random access procedure and the four-step random access procedure, a first power control parameter includes: when determining that the first time-frequency resource is not the random access channel time-frequency resource used in both the two-step random access procedure and the four-step random access procedure, determining, by the terminal device, that the path loss compensation factor is the reference path loss compensation factor, and determining that the power offset between the PUSCH information in the random access message and the random access preamble in the random access message is the reference power offset.

With reference to the first aspect, in a possible implementation of the first aspect, the method further includes: determining, by the terminal device, a first frequency domain resource and a second frequency domain resource, where the first frequency domain resource is a frequency domain resource used to send the random access preamble in the random access message, and the second frequency domain resource is a frequency domain resource used to send the PUSCH information in the random access message; and when determining that the first frequency domain resource is the same as the second frequency domain resource or the first frequency domain resource includes the second frequency domain resource, determining, by the terminal device, at least one of the random access preamble transmit power and the transmit power of the PUSCH information based on a transmit power offset value.

With reference to the first aspect, in a possible implementation of the first aspect, before determining the random access preamble transmit power and the transmit power of the PUSCH information based on the transmit power offset value, the method further includes: receiving the transmit power offset value sent by the access network device.

With reference to the first aspect, in a possible implementation of the first aspect, before determining the random access preamble transmit power and the transmit power of the PUSCH information based on the transmit power offset value, the method further includes: determining the transmit power offset value based on a bandwidth used to send the random access preamble and a bandwidth used to send the PUSCH information.

With reference to the first aspect, in a possible implementation of the first aspect, the determining the transmit power offset value based on a bandwidth used to send the random access preamble and a bandwidth used to send the PUSCH information includes: determining the transmit power offset value according to the following formula: $\Delta_2=10\log_{10}(W_1/W_2)$, where $\Delta_2$ represents the transmit power offset value, $W_1$ represents the bandwidth used to send the PUSCH information, and $W_2$ represents the bandwidth used to send the random access preamble.

With reference to the first aspect, in a possible implementation of the first aspect, the determining the transmit power offset value based on a bandwidth used to send the random access preamble and a bandwidth used to send the PUSCH information includes: receiving a power offset adjustment parameter sent by the access network device; and determining the transmit power offset value according to the following formula: $\Delta_2=10\log_{10}(W_1/W_2)+\Delta_3$, where $\Delta_2$ represents the transmit power offset value, $W_1$ represents the bandwidth used to send the PUSCH information, $W_2$ represents the bandwidth used to send the random access preamble, and $\Delta_3$ represents the power offset adjustment parameter.

With reference to the first aspect, in a possible implementation of the first aspect, the determining the random access preamble transmit power and the transmit power of the PUSCH information based on the transmit power offset value includes: determining the random access preamble transmit power; and determining the transmit power of the PUSCH information according to the following formula: $P_{PUSCH}=P_{PRACH}+\Delta_2$, where $P_{PUSCH}$ represents the transmit power of the PUSCH information, $P_{PRACH}$ represents the random access preamble transmit power, and $\Delta_2$ represents the transmit power offset value.

With reference to the first aspect, in a possible implementation of the first aspect, the determining the random access preamble transmit power and the transmit power of the PUSCH information based on the transmit power offset value includes: determining a first random access preamble reference transmit power and a first PUSCH information reference transmit power; and if a difference between the first PUSCH information reference transmit power and the first random access preamble reference transmit power is less than the transmit power offset value, determining that the random access preamble transmit power is equal to the first random access preamble reference transmit power, and that the transmit power of the PUSCH information is equal to a sum of the first random access preamble reference transmit power and the transmit power offset value; and if the difference between the first PUSCH information reference transmit power and the first random access preamble reference transmit power is greater than or equal to the transmit power offset value, determining that the random access preamble transmit power is equal to a difference between the first PUSCH information reference transmit power and the transmit power offset value, and that the transmit power of the PUSCH information is equal to the first PUSCH information reference transmit power.

With reference to the first aspect, in a possible implementation of the first aspect, the determining the random access preamble transmit power and the transmit power of the PUSCH information based on the transmit power offset value includes: if the transmit power offset value is greater than 0, determining that the transmit power of the PUSCH information is the maximum transmit power, and that the random access preamble transmit power is a difference between the maximum transmit power and the transmit power offset value; and if the difference between the transmit power offset value is less than 0, determining that the random access preamble transmit power is the maximum transmit power, and that the transmit power of the PUSCH information is a difference between the maximum transmit power and the transmit power offset value.

With reference to the first aspect, in a possible implementation of the first aspect, the method further includes: determining, by the terminal device, that the PUSCH power ramp step is the same as the random access preamble power ramp step; or receiving, by the terminal device, the PUSCH power ramp step sent by the access network device.

With reference to the first aspect, in a possible implementation of the first aspect, the method further includes: determining, by the terminal device, that the random access preamble power ramp step is the same as the random access preamble power ramp step in the four-step random access procedure; or determining, by the terminal device, that the random access preamble power ramp step is a sum of the random access preamble power ramp step in the four-step random access procedure and the power ramp step offset value.

With reference to the first aspect, in a possible implementation of the first aspect, before determining the power control adjustment amount based on the target-power ramp step, the method further includes: determining, by the terminal device, that a beam used to retransmit the PUSCH information is the same as a beam used to previously send the PUSCH information; or determining, by the terminal device, that a beam used to retransmit the PUSCH information is the same as a beam used to previously send the PUSCH information, and that a beam used to retransmit the random access preamble in the random access message is the same as a beam used to previously send the random access preamble.

With reference to the first aspect, in a possible implementation of the first aspect, the method further includes: when determining that the beam used to retransmit the random access preamble in the random access message is the same as the beam used to previously send the random access preamble, determining, by the terminal device based on the random access preamble power ramp step, a transmit power used to retransmit the random access preamble; or when determining that the beam used to retransmit the random access preamble in the random access message is the same as the beam used to previously send the random access preamble, and that the beam used to retransmit the PUSCH information is the same as the beam used to previously send the PUSCH information, determining, by the terminal device based on the random access preamble power ramp step, a transmit power used to retransmit the random access preamble.

With reference to the first aspect, in a possible implementation of the first aspect, the method further includes: when determining that the beam used to retransmit the PUSCH information is different from the beam used to previously send the PUSCH information, determining, by the terminal device, that a transmit power used to retransmit the PUSCH information is the same as a transmit power used to previously transmit the PUSCH information; or when determining that the beam used to retransmit the PUSCH information is the same as the beam used to previously send the PUSCH information, and that the beam used to retransmit the random access preamble in the random access message is different from the beam used to previously send the random access preamble, determining, by the terminal device, that a transmit power used to retransmit the PUSCH information is the same as a transmit power used to previously transmit the PUSCH information.

With reference to the first aspect, in a possible implementation of the first aspect, when determining that the beam used to retransmit the random access preamble is different from the beam used to previously send the random access preamble, determining, by the terminal device, that the transmit power used to retransmit the random access preamble is the same as a transmit power used to previously transmit the random access preamble; or when determining that the beam used to retransmit the PUSCH information is different from the beam used to previously send the PUSCH information, and that the beam used to retransmit the random access preamble in the random access message is the same as the beam used to previously send the random access preamble, determining, by the terminal device, that the transmit power used to retransmit the random access preamble is the same as a transmit power used to previously transmit the random access preamble.

According to a second aspect, an embodiment of this application provides an uplink transmit power determining method, including: determining, by an access network device, first power control information; and sending, by the access network device, a broadcast message, where the broadcast message carries the first power control information. In the foregoing technical solution, the access network device may configure, for terminal devices in a cell, same first power control information used to determine an MCS compensation factor, and send the first power control information in a broadcast manner. In this case, terminal devices in a same cell can determine an MCS compensation factor based on same first power control information.

With reference to the second aspect, in a possible implementation of the second aspect, the method further includes: sending, by the access network device, a first power offset parameter and a second power offset parameter. In the foregoing technical solution, different power offset parameters are considered, and a corresponding power offset parameter is selected according to a requirement to compensate for the first candidate uplink transmit power. Therefore, in the foregoing technical solution, impact of different transmission scenarios on system performance is considered.

With reference to the second aspect, in a possible implementation of the second aspect, the access network device may send the first power offset parameter and the second power offset parameter in a broadcast manner. In the foregoing technical solution, different power offset parameters are considered, and a corresponding power offset parameter is selected according to a requirement to compensate for the first candidate uplink transmit power. Therefore, in the foregoing technical solution, impact of different transmission scenarios on system performance is considered.

With reference to the second aspect, in a possible implementation of the second aspect, the access network device may send the first power offset parameter and the second power offset parameter to a specific terminal device. In the foregoing technical solution, different power offset parameters are considered, and a corresponding power offset parameter is selected according to a requirement to compensate for the first candidate uplink transmit power. Therefore, in the foregoing technical solution, impact of different transmission scenarios on system performance is considered.

According to a third aspect, an embodiment of this application provides a communication apparatus. The apparatus includes modules configured to perform the method according to any one of the first aspect or the possible implementations of the first aspect.

Optionally, the communication apparatus in the third aspect may be a terminal device, or may be a component (for example, a chip or a circuit) that can be used in the terminal device.

According to a fourth aspect, an embodiment of this application provides a communication apparatus. The apparatus includes modules configured to perform the method according to any one of the second aspect or the possible implementations of the second aspect.

Optionally, the communication apparatus in the fourth aspect may be an access network device, or may be a component (for example, a chip or a circuit) that can be used in the access network device.

According to a fifth aspect, an embodiment of this application provides a communication apparatus. The communication apparatus includes at least one processor, and the at least one processor is coupled to a memory and is configured to read and execute instructions in the memory, to implement the method according to any one of the first aspect or the possible implementations of the first aspect.

Optionally, the communication apparatus in the fifth aspect may be a terminal device, or may be a component (for example, a chip or a circuit) that can be used in the terminal device.

According to a sixth aspect, an embodiment of this application provides a communication apparatus. The communication apparatus includes at least one processor, and the at least one processor is coupled to a memory and is configured to read and execute instructions in the memory, to implement the method according to any one of the second aspect or the possible implementations of the second aspect.

Optionally, the communication apparatus in the sixth aspect may be an access network device, or may be a component (for example, a chip or a circuit) that can be used in the access network device.

According to a seventh aspect, an embodiment of this application provides a storage medium. The storage medium stores instructions used to implement the method according to any one of the first aspect or the possible implementations of the first aspect.

According to an eighth aspect, an embodiment of this application provides a storage medium. The storage medium stores instructions used to implement the method according to any one of the second aspect or the possible implementations of the second aspect.

According to a ninth aspect, this application provides a computer program product including instructions. When the computer program product runs on a computer, the computer is enabled to perform the method according to any one of the first aspect or the possible implementations of the first aspect.

According to a tenth aspect, this application provides a computer program product including instructions. When the computer program product runs on a computer, the computer is enabled to perform the method according to any one of the second aspect or the possible implementations of the second aspect.

According to an eleventh aspect, an embodiment of this application further provides a chip, where the chip can perform the method according to any one of the first aspect or the possible implementations of the first aspect.

According to a twelfth aspect, an embodiment of this application further provides a chip, where the chip can perform the method according to any one of the second aspect or the possible implementations of the second aspect.

According to a thirteenth aspect, an embodiment of this application provides a communication method. The method includes: determining, by a terminal device, a first initial target power and a first power ramp step depending on whether a time-frequency resource (a first time-frequency resource) used to send a random access preamble in a random access message is a random access channel time-frequency resource used in both a two-step random access procedure and a four-step random access procedure, where the first initial target power is an initial target power used to send a random access preamble in a two-step random access procedure, and the first power ramp step is a random access preamble power ramp step in the two-step random access procedure.

With reference to the thirteenth aspect, in a possible implementation of the thirteenth aspect, the determining, by a terminal device, a first initial target power and a first power ramp step depending on whether a first time-frequency resource is a random access channel time-frequency resource used in both a two-step random access procedure and a four-step random access procedure includes: when determining that the first time-frequency resource is the random access channel time-frequency resource used in both the two-step random access procedure and the four-step random access procedure, determining, by the terminal device, that the first initial target power is the same as an initial target power used to send a random access preamble in the four-step random access procedure, and/or the first power ramp step is the same as a random access preamble power ramp step in the four-step random access procedure.

With reference to the thirteenth aspect, in a possible implementation of the thirteenth aspect, the method further includes: receiving, by the terminal device, an initial target power offset value and a power ramp step offset value that are sent by an access network device. The determining, by a terminal device, a first initial target power and a first power ramp step depending on whether a first time-frequency resource is a random access channel time-frequency resource used in both a two-step random access procedure and a four-step random access procedure includes: when determining that the first time-frequency resource is not the random access channel time-frequency resource used in both the two-step random access procedure and the four-step random access procedure, determining, by the terminal device, the first initial target power based on the initial target power offset value and the initial target power used to send the random access preamble in the four-step random access procedure, and/or determining the first power ramp step based on the power ramp step offset value and the random access preamble power ramp step in the four-step random access procedure.

With reference to the thirteenth aspect, in a possible implementation of the thirteenth aspect, the method further includes: receiving, by the terminal device, a reference initial target power and a reference power ramp step that are sent by an access network device and that are used to transmit the random access preamble in the two-step random access procedure. The determining, by a terminal device, a first initial target power and a first power ramp step depending on whether a first time-frequency resource is a random access channel time-frequency resource used in both a two-step random access procedure and a four-step random access procedure includes: when determining that the first time-frequency resource is not the random access channel time-frequency resource used in both the two-step random access procedure and the four-step random access procedure, determining, by the terminal device, that the first initial target power is the reference initial target power, and determines that the first power ramp step is the reference power ramp step.

With reference to the thirteenth aspect, in a possible implementation of the thirteenth aspect, the method further includes: determining, by the terminal device depending on whether the first time-frequency resource is the random access channel time-frequency resource used in both the two-step random access procedure and the four-step random access procedure, a first power control parameter used to send PUSCH information, where the first power control parameter includes at least one of the following parameters: a path loss compensation factor, an MCS compensation factor, and a power offset between the PUSCH information in the random access message and the random access preamble in the random access message.

With reference to the thirteenth aspect, in a possible implementation of the thirteenth aspect, the determining, by the terminal device depending on whether the first time-frequency resource is the random access channel time-frequency resource used in both the two-step random access procedure and the four-step random access procedure, a first power control parameter includes: when determining that the first time-frequency resource is the random access channel time-frequency resource used in both the two-step random access procedure and the four-step random access procedure, determining, by the terminal device, that the path loss compensation factor is the same as a path loss compensation factor in a message 3 in the four-step random access procedure; determining that the MCS compensation factor is the same as an MCS compensation factor in the four-step random access procedure; and/or determining that the power offset between the PUSCH information in the random access message and the random access preamble in the random access message is the same as a power offset between the random access preamble and the message 3 in the four-step random access procedure.

With reference to the thirteenth aspect, in a possible implementation of the thirteenth aspect, the method further includes: receiving, by the terminal device, a path loss compensation factor offset value and a power offset correction value that are sent by the access network device. The determining, by the terminal device depending on whether the first time-frequency resource is the random access channel time-frequency resource used in both the two-step random access procedure and the four-step random access procedure, a first power control parameter includes: when determining that the first time-frequency resource is not the random access channel time-frequency resource used in both the two-step random access procedure and the four-step random access procedure, determining, by the terminal device, the path loss compensation factor based on the path loss compensation factor offset value and the path loss compensation factor in the message 3 in the four-step random access procedure, and determining the power offset between the PUSCH information in the random access message and the random access preamble in the random access message based on the power offset correction value and the power offset between the random access preamble and the message 3 in the four-step random access procedure.

With reference to the thirteenth aspect, in a possible implementation of the thirteenth aspect, the method further includes: receiving, by the terminal device, a reference path loss compensation factor and a reference power offset that are sent by the access network device and that are used to send a PUSCH in the two-step random access procedure. The determining, by the terminal device depending on whether the first time-frequency resource is the random access channel time-frequency resource used in both the two-step random access procedure and the four-step random access procedure, a first power control parameter includes: when determining that the first time-frequency resource is not the random access channel time-frequency resource used in both the two-step random access procedure and the four-step random access procedure, determining, by the terminal device, that the path loss compensation factor is the reference path compensation factor, and determining that the power offset between the PUSCH information in the random access message and the random access preamble in the random access message is the reference power offset.

According to a fourteenth aspect, an embodiment of this application provides a transmit power determining method. The method includes: determining, by a terminal device, a first frequency domain resource and a second frequency domain resource, where the first frequency domain resource is a frequency domain resource used to send a random access preamble in a random access message, and the second frequency domain resource is a frequency domain resource used to send PUSCH information in the random access message; and when determining that the first frequency domain resource is the same as the second frequency domain resource or the first frequency domain resource includes the second frequency domain resource, determining, by the terminal device, at least one of a random access preamble transmit power and a transmit power of the PUSCH information based on a transmit power offset value. In the foregoing technical solution, an offset relationship between the random access preamble transmit power and the transmit power of the PUSCH information is determined depending on whether the random access preamble and the PUSCH information are in a same time-frequency resource position. This helps an access network device perform channel estimation based on the random access preamble.

With reference to the fourteenth aspect, in a possible implementation of the fourteenth aspect, before determining the random access preamble transmit power and the transmit power of the PUSCH information based on the transmit power offset value, the method further includes: receiving the transmit power offset value sent by the access network device.

With reference to the fourteenth aspect, in a possible implementation of the fourteenth aspect, before determining the random access preamble transmit power and the transmit power of the PUSCH information based on the transmit power offset value, the method further includes: determining the transmit power offset value based on a bandwidth used to send the random access preamble and a bandwidth used to send the PUSCH information.

With reference to the fourteenth aspect, in a possible implementation of the fourteenth aspect, the determining the transmit power offset value based on a bandwidth used to send the random access preamble and a bandwidth used to send the PUSCH information includes: determining the transmit power offset value according to the following formula: $\Delta_2=10\log_{10}(W_1/W_2)$, where $\Delta_2$ represents the transmit power offset value, $W_1$ represents the bandwidth used to send the PUSCH information, and $W_2$ represents the bandwidth used to send the random access preamble.

With reference to the fourteenth aspect, in a possible implementation of the fourteenth aspect, the determining the transmit power offset value based on a bandwidth used to send the random access preamble and a bandwidth used to send the PUSCH information includes: receiving a power offset adjustment parameter sent by the access network device; and determining the transmit power offset value according to the following formula: $\Delta_2=10\log_{10}(W_1/W_2)+\Delta_3$, where $\Delta_2$ represents the transmit power offset value, $W_1$ represents the bandwidth used to send the PUSCH information, $W_2$ represents the bandwidth used to send the random access preamble, and $\Delta_3$ represents the power offset adjustment parameter.

With reference to the fourteenth aspect, in a possible implementation of the fourteenth aspect, the determining the random access preamble transmit power and the transmit power of the PUSCH information based on the transmit power offset value includes: determining the random access preamble transmit power; and determining the transmit power of the PUSCH information according to the following formula: $P_{PUSCH}=P_{PRACH}+\Delta_2$, where $P_{PUSCH}$ represents the transmit power of the PUSCH information, $P_{PRACH}$ represents the random access preamble transmit power, and $\Delta_2$ represents the transmit power offset value.

With reference to the fourteenth aspect, in a possible implementation of the fourteenth aspect, the determining the random access preamble transmit power and the transmit power of the PUSCH information based on the transmit power offset value includes: determining a first random access preamble reference transmit power and a first PUSCH information reference transmit power; and if a difference between the first PUSCH information reference transmit power and the first random access preamble reference transmit power is less than the transmit power offset value, determining that the random access preamble transmit power is equal to the first random access preamble reference transmit power, and that the transmit power of the PUSCH information is equal to a sum of the first random access preamble reference transmit power and the transmit power offset value; and if the difference between the first PUSCH information reference transmit power and the first random access preamble reference transmit power is greater than or equal to the transmit power offset value, determining that the random access preamble transmit power is equal to a difference between the first PUSCH information reference transmit power and the transmit power offset value, and that the transmit power of the PUSCH information is equal to the first PUSCH information reference transmit power.

With reference to the fourteenth aspect, in a possible implementation of the fourteenth aspect, the determining the random access preamble transmit power and the transmit power of the PUSCH information based on the transmit power offset value includes: if the transmit power offset value is greater than 0, determining that the transmit power of the PUSCH information is a maximum transmit power, and that the random access preamble transmit power is a difference between the maximum transmit power and the transmit power offset value; and if the difference between the transmit power offset value is less than 0, determining that the random access preamble transmit power is the maximum transmit power, and that the transmit power of the PUSCH information is a difference between the maximum transmit power and the transmit power offset value.

According to a fifteenth aspect, an embodiment of this application provides a transmit power determining method. The method includes: determining, by a terminal device, whether a beam used to retransmit PUSCH information is the same as a beam used to previously send the PUSCH information; determining, by the terminal device, whether a beam used to retransmit a random access preamble in a random access message is the same as a beam used to previously send the random access preamble; and determining, by the terminal device based on determining results, whether to perform retransmission transmit power ramping.

With reference to the fifteenth aspect, in a possible implementation of the fifteenth aspect, the method further includes: determining, by the terminal device, that a PUSCH power ramp step is the same as a random access preamble power ramp step; or receiving, by the terminal device, a PUSCH power ramp step sent by an access network device.

With reference to the fifteenth aspect, in a possible implementation of the fifteenth aspect, the method further includes: determining, by the terminal device, that the random access preamble power ramp step is the same as a random access preamble power ramp step in a four-step random access procedure; or determining, by the terminal device, that the random access preamble power ramp step is a sum of a random access preamble power ramp step in a four-step random access procedure and a power ramp step offset value.

With reference to the fifteenth aspect, in a possible implementation of the fifteenth aspect, the determining, by the terminal device based on determining results, whether to perform retransmission transmit power ramping includes: when determining that the beam used to retransmit the PUSCH information is the same as the beam used to previously send the PUSCH information, determining, by the terminal device based on the PUSCH power ramp step, a transmit power used to retransmit the PUSCH information (determining to ramp the transmit power used to retransmit the PUSCH information); or when determining that the beam used to retransmit the PUSCH information is the same as the beam used to previously send the PUSCH information, and that the beam used to retransmit the random access preamble in the random access message is the same as the beam used to previously send the random access preamble, determining, by the terminal device based on the PUSCH power ramp step, a transmit power used to retransmit the PUSCH information (determining to ramp the transmit power used to retransmit the PUSCH information).

With reference to the fifteenth aspect, in a possible implementation of the fifteenth aspect, the determining, by the terminal device based on determining results, whether to perform retransmission transmit power ramping includes: when determining that the beam used to retransmit the random access preamble in the random access message is the same as the beam used to previously send the random access preamble, determining, by the terminal device based on the random access preamble power ramp step, a transmit power used to retransmit the random access preamble (that is, determining to ramp the transmit power used to retransmit the random access preamble); or when determining that the beam used to retransmit the random access preamble in the random access message is the same as the beam used to previously send the random access preamble, and that the beam used to retransmit the PUSCH information is the same as the beam used to previously send the PUSCH information, determining, by the terminal device based on the random access preamble power ramp step, a transmit power used to retransmit the random access preamble (that is, determining to ramp the transmit power used to retransmit the random access preamble).

With reference to the fifteenth aspect, in a possible implementation of the fifteenth aspect, the method further includes: when determining that the beam used to retransmit the PUSCH information is different from the beam used to previously send the PUSCH information, determining, by the terminal device, that the transmit power used to retransmit the PUSCH information is the same as a transmit power used to previously transmit the PUSCH information; or when determining that the beam used to retransmit the PUSCH information is the same as the beam used to previously send the PUSCH information, and that the beam used to retransmit the random access preamble in the random access message is different from the beam used to previously send the random access preamble, determining, by the terminal device, that the transmit power used to retransmit the PUSCH information is the same as a transmit power used to previously transmit the PUSCH information.

With reference to the fifteenth aspect, in a possible implementation of the fifteenth aspect, the method further includes: when determining that the beam used to retransmit the random access preamble is different from the beam used to previously send the random access preamble, determining, by the terminal device, that the transmit power used to retransmit the random access preamble is the same as a transmit power used to previously transmit the random access preamble; or when determining that the beam used to retransmit the PUSCH information is different from the beam used to previously send the PUSCH information, and that the beam used to retransmit the random access preamble in the random access message is the same as the beam used to previously send the random access preamble, determining, by the terminal device, that the transmit power used to retransmit the random access preamble is the same as a transmit power used to previously transmit the random access preamble.

According to a sixteenth aspect, an embodiment of this application provides a communication apparatus. The apparatus includes modules configured to perform the method according to any one of the thirteenth aspect or the possible implementations of the thirteenth aspect.

Optionally, the communication apparatus in the sixteenth aspect may be a terminal device, or may be a component (for example, a chip or a circuit) that can be used in the terminal device.

According to a seventeenth aspect, an embodiment of this application provides a communication apparatus. The communication apparatus includes at least one processor, and the at least one processor is coupled to a memory and is configured to read and execute instructions in the memory, to implement the method according to any one of the thirteenth aspect or the possible implementations of the thirteenth aspect.

Optionally, the communication apparatus in the seventeenth aspect may be a terminal device, or may be a component (for example, a chip or a circuit) that can be used in the terminal device.

According to an eighteenth aspect, an embodiment of this application provides a storage medium. The storage medium stores instructions used to implement the method according to any one of the thirteenth aspect or the possible implementations of the thirteenth aspect.

According to a nineteenth aspect, this application provides a computer program product including instructions. When the computer program product runs on a computer, the computer is enabled to perform the method according to any one of the thirteenth aspect or the possible implementations of the thirteenth aspect.

According to a twentieth aspect, an embodiment of this application further provides a chip. The chip can perform the method according to any one of the thirteenth aspect or the possible implementations of the thirteenth aspect.

According to a twenty-first aspect, an embodiment of this application provides a communication apparatus. The apparatus includes modules configured to perform the method according to any one of the fourteenth aspect or the possible implementations of the fourteenth aspect.

Optionally, the communication apparatus in the twenty-first aspect may be a terminal device, or may be a component (for example, a chip or a circuit) that can be used in the terminal device.

According to a twenty-second aspect, an embodiment of this application provides a communication apparatus. The communication apparatus includes at least one processor, and the at least one processor is coupled to a memory and is configured to read and execute instructions in the memory, to implement the method according to any one of the fourteenth aspect or the possible implementations of the fourteenth aspect.

Optionally, the communication apparatus in the twenty-second aspect may be a terminal device, or may be a component (for example, a chip or a circuit) that can be used in the terminal device.

According to a twenty-third aspect, an embodiment of this application provides a storage medium. The storage medium stores instructions used to implement the method according to any one of the fourteenth aspect or the possible implementations of the fourteenth aspect.

According to a twenty-fourth aspect, this application provides a computer program product including instructions. When the computer program product runs on a computer, the computer is enabled to perform the method according to any one of the fourteenth aspect or the possible implementations of the fourteenth aspect.

According to a twenty-fifth aspect, an embodiment of this application further provides a chip. The chip can perform the method according to any one of the fourteenth aspect or the possible implementations of the fourteenth aspect.

According to a twenty-sixth aspect, an embodiment of this application provides a communication apparatus. The apparatus includes modules configured to perform the method according to any one of the fifteenth aspect or the possible implementations of the fifteenth aspect.

Optionally, the communication apparatus in the twenty-sixth aspect may be a terminal device, or may be a component (for example, a chip or a circuit) that can be used in the terminal device.

According to a twenty-seventh aspect, an embodiment of this application provides a communication apparatus. The communication apparatus includes at least one processor, and the at least one processor is coupled to a memory and is configured to read and execute instructions in the memory, to implement the method according to any one of the fifteenth aspect or the possible implementations of the fifteenth aspect.

Optionally, the communication apparatus in the twenty-seventh aspect may be a terminal device, or may be a component (for example, a chip or a circuit) that can be used in the terminal device.

According to a twenty-eighth aspect, an embodiment of this application provides a storage medium. The storage medium stores instructions used to implement the method according to any one of the fifteenth aspect or the possible implementations of the fifteenth aspect.

According to a twenty-ninth aspect, this application provides a computer program product including instructions. When the computer program product runs on a computer, the computer is enabled to perform the method according to any one of the fifteenth aspect or the possible implementations of the fifteenth aspect.

According to a thirtieth aspect, an embodiment of this application further provides a chip. The chip can perform the method according to any one of the fifteenth aspect or the possible implementations of the fifteenth aspect.

DESCRIPTION OF EMBODIMENTS

Figure 1:
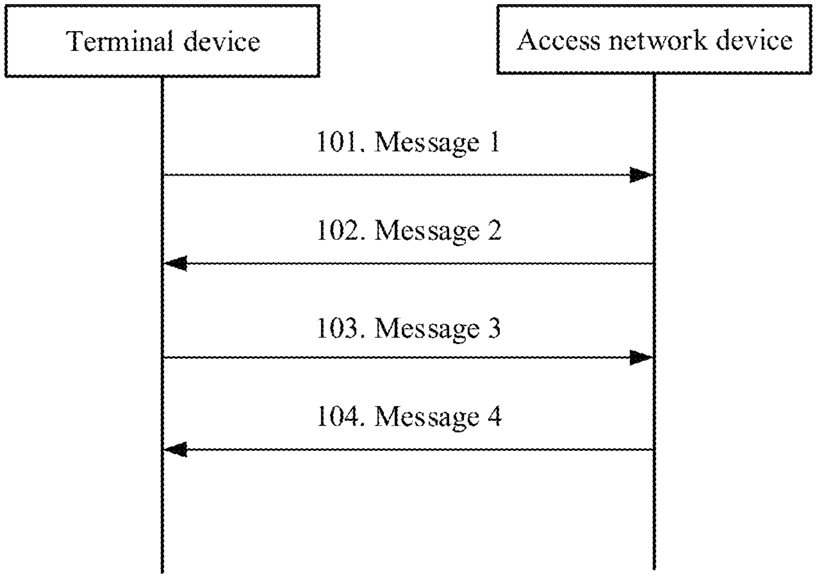
FIG. 1 is a schematic flowchart of a four-step random access procedure.

The following describes technical solutions of this application with reference to the accompanying drawings.

In this application, "at least one" means one or more, and "a plurality of" means two or more. The term "and/or" describes an association relationship between associated objects and represents that three relationships may exist. For example, A and/or B may represent the following cases:

Only A exists, both A and B exist, and only B exists, where A and B may be singular or plural. The character "/" usually indicates an "or" relationship between the associated objects. "At least one of the following items (pieces)" or a similar expression thereof means any combination of these items, including a single item (piece) or any combination of a plurality of items (pieces). For example, at least one of a, b, or c may indicate: a, b, c, a-b, a-c, b-c, or a-b-c, where a, b, and c may be in a singular or plural form. In addition, in the embodiments of this application, terms such as "first" and "second" do not limit a quantity or an execution sequence.

It should be noted that in this application, the term such as "example" or with "for example" is used to represent giving an example, an illustration, or descriptions. Any embodiment or design scheme described as an "example" or with "for example" in this application should not be explained as being more preferred or having more advantages than another embodiment or design scheme. Exactly, use of the word such as "example" or "for example" is intended to present a related concept in a specific manner.

The technical solutions in the embodiments of this application may be applied to various communication systems that support a two-step random access procedure, for example, a 5th generation (5G) system or a new radio access technology (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, a terminal device in a future evolved public land mobile network (PLMN), or the like. This is not limited in the embodiments of this application.

An access network device in the embodiments of this application may be a device configured to communicate with the terminal device. The access network device may be a network device in a 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant communication software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but are not limited to a radio channel and various other media that can store, include, and/or carry instructions and/or data.

Unless otherwise specified, a random access preamble in the embodiments of this application is a random access preamble sent by the terminal device in the two-step random access procedure, and PUSCH information in the embodiments of this application is PUSCH information sent by the terminal device in the two-step random access procedure. The random access preamble sent by the terminal device in the two-step random access procedure may also be referred to as a two-step random access preamble, and the PUSCH information sent by the terminal device in the two-step random access procedure may also be referred to as two-step PUSCH information. For ease of description, in the embodiments of this application, a random access preamble sent by the terminal device in a four-step random access procedure is referred to as a four-step random access preamble, and PUSCH information sent by the terminal device in the four-step random access procedure is referred to as four-step PUSCH information.

Figure 3:
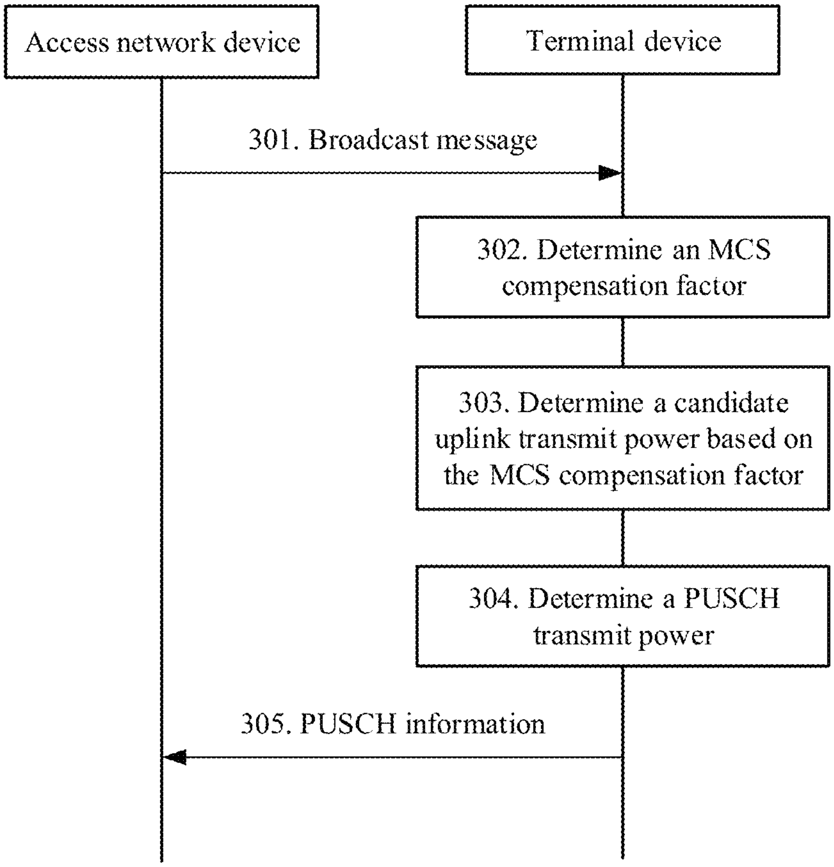
FIG. 3 is a schematic flowchart of an uplink transmit power determining method according to an embodiment of this application.

FIG. 3 is a schematic flowchart of an uplink transmit power determining method according to an embodiment of this application.

301. An access network device sends a broadcast message carrying first power control information. Correspondingly, the terminal device receives the broadcast message that carries the first power control information and that is sent by the access network device, where the first power control information is used to determine a modulation and coding scheme (MCS) compensation factor.

302. The terminal device determines the MCS compensation factor based on the first power control information.

303. The terminal device determines a first candidate uplink transmit power based on the MCS compensation factor.

304. The terminal device determines a smaller value in the first candidate uplink transmit power and a second candidate uplink transmit power as a physical uplink shared channel (PUSCH) transmit power, where the second candidate uplink transmit power is determined based on a maximum transmit power that can be used by the terminal device.

305. The terminal device sends PUSCH information in a random access message based on the PUSCH transmit power.

In the method shown in FIG. 3, the first power control information that is obtained by the terminal device and that is used to determine the MCS compensation factor is sent by the access network device in a broadcast manner. Therefore, in addition to the terminal device, another terminal device that is in a same cell as the terminal device can also receive the same first power control information. In other words, the access network device configures the same first power control information for all terminal devices in the cell. For ease of description, the first power control information may be referred to as cell-level first power control information below.

Figure 2:
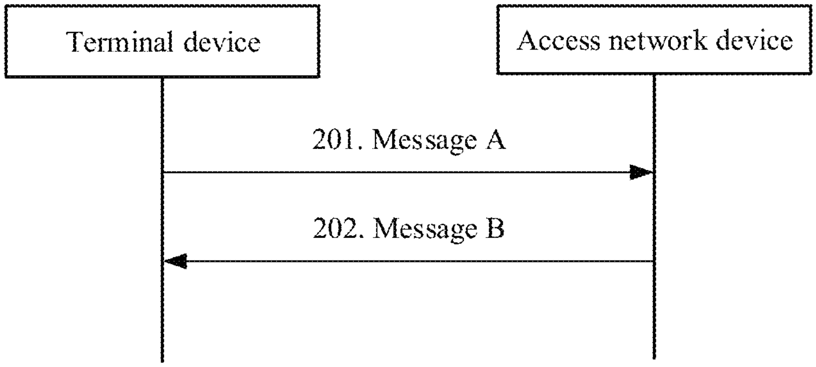
FIG. 2 is a schematic diagram of a two-step random access procedure.

The random access message may be the Msg A sent by the terminal device to the access network device in the method shown in FIG. 2. As described above, the Msg A includes a random access preamble and data. The data in the Msg A is carried on a PUSCH. In addition to transmitting data, the PUSCH may be further used to transmit control information, for example, a channel quality indicator (CQI), a reference signal received power (RSRP), and a rank indication (RI). For ease of description, in the embodiments of this application, the control information and the data that are transmitted on the PUSCH are collectively referred to as the PUSCH information.

In a two-step random access procedure, a random access message sent by the terminal device to the access network device for the first time may be referred to as an initially transmitted random access message. The initially transmitted random access message may include a random access preamble and the PUSCH information.

In some cases, the terminal device can complete a random access procedure by sending the random access message to the access network device only once.

In some other cases, the access network device may not obtain the random access message sent by the terminal device. For example, the access network device may not receive the random access message sent by the terminal device, or may not correctly parse the random access message sent by the terminal device. In these cases, the terminal device needs to send the random access message to the access network device again until the access network device successfully obtains the random access message sent by the terminal device or a maximum quantity of retransmission times is reached. For ease of description, the random access message re-sent by the terminal device to the access network device is referred to as a retransmitted random access message below.

As described above, the random access message may include the random access preamble and the PUSCH information. In some cases, the access network device may successfully obtain the random access preamble in the random access message, but fails to obtain the PUSCH information in the random access message. In these cases, the random access message (namely, the retransmitted random access message) sent by the terminal device to the access network device again may carry only the PUSCH information. For ease of description, the retransmitted random access message that carries only the PUSCH information is referred to as a first-type retransmitted random access message below. In some other cases, neither the random access preamble nor the PUSCH information in the random access message may be successfully obtained by the access network device. In these cases, the random access message (namely, the retransmitted random access message) sent by the terminal device to the access network device again needs to carry the random access preamble and the PUSCH information. For ease of description, the retransmitted random access message that carries the random access preamble and the PUSCH information is referred to as a second-type retransmitted random access message below. In some other cases, the access network device may successfully obtain the PUSCH information in the random access message, but fails to obtain the random access preamble in the random access message. In these cases, the random access message (namely, the retransmitted random access message) sent by the terminal device to the access network device again may carry only the random access preamble. For ease of description, the retransmitted random access message that carries only the random access preamble is referred to as a third-type retransmitted random access message below.

In the method shown in FIG. 3, the random access message sent by the terminal device to the access network device may be the initially transmitted random access message, or may be the retransmitted random access message. The retransmitted random access message may be the first-type random access message, the second-type random access message, or the third-type random access message.

Optionally, in some embodiments, the access network device may send a first power offset parameter and a second power offset parameter to the terminal device. Correspondingly, the terminal device receives the first power offset parameter and the second power offset parameter that are sent by the access network device, and determines a target power based on the first power offset parameter or the second power offset parameter. That the terminal device determines a first candidate uplink transmit power based on the MCS compensation factor includes: The terminal device determines the first candidate uplink transmit power based on the target power and the MCS compensation factor.

Optionally, in some embodiments, that the terminal device determines the first candidate uplink transmit power based on the target power and the MCS compensation factor includes: The terminal device determines the first candidate uplink transmit power based on the target power, the MCS compensation factor, and at least one of a bandwidth adjustment amount, a path loss adjustment amount, and a power control adjustment amount.

Optionally, in some embodiments, the terminal device may determine the first candidate uplink transmit power according to the following formula:

$$P_{Can,b,f,c}(i,\ j) = P_{O_{PUSCH},b,f,c}(j) + 10\log_{10}\left(2^{\mu} \cdot M_{RB,b,f,c}^{PUSCH}(i)\right) + \alpha_{b,f,c}(j) \cdot PL_{b,f,c} + \Delta_{TF,b,f,c}(i) \quad \text{(Formula 1.1)}$$

In the formula 1.1, $P_{Can,b,f,c}(i,\ j)$ represents the first candidate uplink transmit power, $P_{O_{PUSCH},b,f,c}(j)$ represents the target power, $$10\log_{10}\left(2^{\mu} \cdot M_{RB,b,f,c}^{PUSCH}(i)\right)$$

represents the bandwidth adjustment amount, $\alpha_{b,f,c}(j)$. $PL_{b,f,c}$ represents the path loss adjustment amount, and $\Delta_{TF,b,f,c}(i)$ represents the MCS compensation factor. More specifically, $$M_{RB,b,f,c}^{PUSCH}(i)$$

represents a transmission bandwidth that is of a PUSCH and that is allocated to the terminal device, $\alpha_{b,f,c}(j)$ represents a path loss compensation factor, $PL_{b,f,c}$ represents an estimated path loss, b represents a bandwidth part (BWP) sequence number, f represents a carrier sequence number, c represents a sequence number of a serving cell of the terminal device, i represents a transmission time unit sequence number, j represents a configuration index, and μ is used to indicate different subcarrier spacing sequence numbers. The configuration index may be a positive integer greater than or equal to 0 and less than or equal to J, and J is a positive integer greater than or equal to 1. The configuration index may be used to indicate a manner of determining the target power. For example, if j is equal to a first preset value, the target power may be determined by using a formula 1.17. For another example, if j is equal to a second preset value, the target power may be determined by using a formula 1.18. j may be further used to determine a value of $\alpha_{b,f,c}(j)$. A value of j may be used to indicate whether the value of $\alpha_{b,f,c}(j)$ is a preset default value or a value configured by a network device. For example, if j is equal to the first preset value, $\alpha_{b,f,c}(j)$ may be a default value. If j is equal to the second preset value, $\alpha_{b,f,c}(j)$ is a value configured by a higher layer. When j is equal to the second preset value, the terminal device may further receive the path loss compensation factor sent by the access network device. The transmission bandwidth that is of the PUSCH and that is allocated to the terminal device may be represented by a quantity of resource blocks (RB).

The target power may also be referred to as an expected power, and is a received power expected by the access network device. A demodulation performance requirement of the PUSCH can be met in case of this received power.

Optionally, in some embodiments, the estimated path loss represented by $PL_{b,f,c}$ may be an estimated path loss of a reference signal indicated by a parameter $q_d$, where $q_d$ represents an index of the reference signal. In this case, $P_{Can,b,f,c}(i, j)$ may also be represented as $P_{Can,b,f,c}(i,j,q_d)$.

The first power control information may be carried in a master information block (MIB), or may be carried in a system information block (SIB).

The first power control information may be represented as $K_S$. Optionally, in some embodiments, a value of $K_S$ may be 1.25. Optionally, in some other embodiments, a value of $K_S$ may be 0. Optionally, in some other embodiments, the first power control information may alternatively be another value greater than 0.

If the value of $K_S$ is 0, a value of $\Delta_{TF,b,f,c}(i)$ is 0. $\Delta_{TF,b,f,c}(i)$ being 0 indicates that no MCS adjustment is performed.

If the value of $K_S$ is 1.25, $$\Delta_{TF,b,f,c}(i) = 10\log_{10}\left(\left(2^{BPRE*K_S} - 1\right)\cdot\beta_{offset}^{PUSCH}\right),$$

where BPRE is an average quantity of bits of each resource element (Resource Element, RE). If the PUSCH information includes only the control information, $BPRE=O_{CSI}/N_{RE}$. $O_{CSI}$ is a quantity of bits in channel state information (CSI) part 1 (Part 1). $N_{RE}$ is a quantity of REs in the PUSCH information minus a quantity of REs in a DMRS and a quantity of phase tracking reference signals (PT-RS). The quantity of bits in the CSI part 1 is determined by the terminal device. The terminal device may further send the determined quantity of bits in the CSI part 1 to the access network device. If the PUSCH information does not include only the control information (that is, the PUSCH information includes both the control information and the data, or the PUSCH includes only the data), $$BPRE = \sum_{r=0}^{C-1} K_r/N_{RE},$$

where C indicates a quantity of code blocks into which the PUSCH data is segmented through channel coding, and $K_r$ indicates a size of an $r^{th}$ code block. The quantity of code blocks and the size of the $r^{th}$ code block are obtained by the terminal device through calculation according to a formula agreed upon in a protocol.

$$\beta_{offset}^{PUSCH}$$

indicates compensation that may be made when the PUSCH is used to transmit the control information. If the PUSCH information includes only the control information, $$\beta_{offset}^{PUSCH} = \beta_{offset}^{CSI,1}, \text{ where } \beta_{offset}^{CSI,1}$$

is a correction factor specified in a current protocol, and is used to indicate a proportion of REs occupied by the control information. If the PUSCH information does not include only the control information (that is, the PUSCH information includes both the control information and the data, or the PUSCH information includes only the data), $$\beta_{offset}^{PUSCH} = 1.$$

For example, $K_S$ is equal to 1.25. It may be learned that some parameters used by the terminal device when the terminal device determines $\Delta_{TF,b,f,c}(i)$ are related to the terminal device or are determined by the terminal device. Different terminal devices in a same cell may use different parameters to determine $\Delta_{TF,b,f,c}(i)$. However, these terminal devices all determine the MCS compensation factor based on the same first power control information.

The terminal device may obtain the transmission bandwidth that is of the PUSCH and that is allocated by the network device to the terminal device. The terminal device may obtain the path loss compensation factor based on higher layer signaling received from the access network device. The terminal device may determine the path loss based on a transmit power of a downlink reference signal and the measured reference signal received power (Reference Signal Received Power, RSRP).

Optionally, in some other embodiments, the terminal device may alternatively determine the first candidate uplink transmit power according to the following formula:

$$P_{Can,b,f,c}(i,j) = P_{O_{PUSCH},b,f,c}(j) + 10\log_{10}\left(2^{\mu}\cdot M_{RB,b,f,c}^{PUSCH}(i)\right) + \alpha_{b,f,c}(j)\cdot PL_{b,f,c} + \Delta_{TF,b,f,c}(i) + f_{b,f,c}(i) \quad \text{(Formula 1.2)}$$

In the formula 1.2, $P_{Can,b,f,c}(i, j)$ represents the first candidate uplink transmit power, $P_{O_{PUSCH},b,f,c}(j)$ represents the target power, $$10\log_{10}(2^{\mu} \cdot M_{RB,b,f,c}^{PUSCH}(i))$$

represents the bandwidth adjustment amount, $\alpha_{b,f,c}(j) \cdot PL_{b,f,c}$ represents the path loss adjustment amount, $\Delta_{TF,b,f,c}(i)$ represents the MCS compensation factor, and $f_{b,f,c}(i)$ represents the power control adjustment amount. More specifically, $$M_{RB,b,f,c}^{PUSCH}(i)$$

represents a transmission bandwidth that is of a PUSCH and that is allocated to the terminal device, $\alpha_{b,f,c}(j)$ represents a path loss compensation factor, $PL_{b,f,c}$ represents an estimated path loss, b represents a bandwidth part (BWP) sequence number, i represents a transmission time unit sequence number, f represents a carrier sequence number, c represents a sequence number of a serving cell of the terminal device, j represents a configuration index, and I is used to indicate different subcarrier spacing sequence numbers. The configuration index may be a positive integer greater than or equal to 0 and less than or equal to J, and J is a positive integer greater than or equal to 1. The configuration index may be used to indicate a manner of determining the target power. For example, if j is equal to a first preset value, the target power may be determined by using a formula 1.17. For another example, if j is equal to a second preset value, the target power may be determined by using a formula 1.18. j may be further used to determine a value of $\alpha_{b,f,c}(j)$. A value of j may be used to indicate whether the value of $\alpha_{b,f,c}(j)$ is a preset default value or a value configured by a network device. For example, if j is equal to the first preset value, $\alpha_{b,f,c}(j)$ may be a default value. If j is equal to the second preset value, $\alpha_{b,f,c}(j)$ is a value configured by a higher layer. When j is equal to the second preset value, the terminal device may further receive the path loss compensation factor sent by the access network device. The transmission bandwidth that is of the PUSCH and that is allocated to the terminal device may be represented by a quantity of resource blocks (RB).

Optionally, in some embodiments, the estimated path loss represented by $PL_{b,f,c}$ may be an estimated path loss of a reference signal indicated by a parameter $q_d$, where $q_d$ represents an index of the reference signal. In this case, $P_{Can,b,f,c}(i, j)$ may also be represented as $P_{Can,b,f,c}(i,j,q_d)$.

Manners of determining the transmission bandwidth that is of the PUSCH and that is allocated to the terminal device, the path loss compensation factor, and the path loss that are in the formula 1.2 are the same as those in the formula 1.1. Details are not described herein again. If the random access message is the initially transmitted random access message, the power control adjustment amount is 0. In other words, if the access message is the initially transmitted random access message, the formula 1.2 may be transformed into the formula 1.1.

Optionally, in some embodiments, when the random access message is retransmitted and the random access message further includes the random access preamble (that is, the random access message is the second-type retransmitted random access message), that the terminal device determines the first candidate uplink transmit power based on an asynchronous transmission power offset parameter and the MCS compensation factor may include: The terminal device determines the target power based on the asynchronous transmit power offset parameter. The terminal device determines the power control adjustment amount, where a value of the power control adjustment amount is greater than 0. The terminal device determines the first candidate uplink transmit power based on the target power, the power control adjustment amount, and the MCS compensation factor. Optionally, in some embodiments, the terminal device may determine the first candidate uplink transmit power according to the formula 1.2.

Optionally, in some embodiments, if the random access message is the second-type random access message, the terminal device may determine the power control adjustment amount based on a target-power ramp step and a quantity of times that the random access message has been retransmitted, where the target-power ramp step may be a random access preamble power ramp step or a PUSCH power ramp step.

Optionally, in some embodiments, if the random access message is the second-type retransmitted random access message, the terminal device may determine the power control adjustment amount according to the following formula:

$$f_{b,f,c}(i) = \Delta P_{rampup,b,f,c} \qquad \text{(Formula 1.3)}$$

where $f_{b,f,c}(i)$ represents the power control adjustment amount, and $\Delta P_{rampup,b,f,c}$ represents a total PUSCH power ramped after an adjustment.

Optionally, in some embodiments, the total PUSCH power ramped after the adjustment may be a smaller value in a headroom of a power that can be ramped for the PUSCH and a random access preamble ramp power. In other words, the total PUSCH power ramped after the adjustment may be determined according to the following formula:

(Formula 1.4)

$$\Delta P_{rampup,b,f,c} = \min\left[\left\{\max\left(0, P_{CMAX,f,c} - \left(\begin{array}{l} 10\log_{10}(2^{\mu} \cdot M_{RB,b,f,c}^{PUSCH}(i)) \\ +P_{O_{PUSCH},b,f,c}(j) + \alpha_{b,f,c}(j) \cdot PL_c \\ +\Delta_{TF,b,f,c}(i) \end{array}\right)\right)\right\}, \Delta P_{rampuprequested,b,f,c}\right] \text{where}$$

$$\max\left(0, P_{CMAX,f,c} - \left(\begin{array}{l} 10\log_{10}(2^{\mu} \cdot M_{RB,b,f,c}^{PUSCH}(i)) \\ +P_{O_{PUSCH},b,f,c}(j) + \alpha_{b,f,c}(j) \cdot PL_c \\ +\Delta_{TF,b,f,c}(i) \end{array}\right)\right)$$

is the headroom of the power that can be ramped for the PUSCH, $\Delta P_{rampuprequested,b,f,c}$ is the random access preamble ramp power, $P_{CMAX,f,c}$ represents a maximum transmit power configured for the terminal device, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.4 are the same as meanings of parameters in the formula 1.1 and the formula 1.2. Details are not described herein again.

Optionally, in some embodiments, the random access preamble ramp power indicates a power that is increased for the random access preamble from initial transmission to previous transmission. The random access preamble ramp power may be equal to a quantity of actual retransmission times multiplied by a first power ramp step. The quantity of actual retransmission times may be a number recorded in a retransmission counter. For example, in some embodiments, an initial value on the retransmission counter is 0, and the value on the counter is increased by 1 each time the random access message is transmitted. For example, if the value on the counter is 1, it indicates that the random access message is transmitted for the first time (that is, the random access message is initially transmitted). If the value on the counter is 2, it indicates that the random access message is retransmitted for the first time. If the value on the counter is n, it indicates that retransmission is performed n−1 times.

Optionally, in some other embodiments, the random access preamble ramp power indicates a total power increased for the random access preamble. The total increased power is equal to the maximum quantity of retransmission times multiplied by the random access preamble power ramp step. The maximum quantity of retransmission times may be configured by the access network device, or may be a preset value.

$$\max\left(0, P_{CMAX,f,c} - \begin{pmatrix} 10\log_{10}(2^{\mu}\cdot M_{RB,b,f,c}^{PUSCH}(i)) \\ +P_{O_{PUSCH},b,f,c}(j) + \alpha_{b,f,c}(j)\cdot PL_c \\ +\Delta_{TF,b,f,c}(i) \end{pmatrix}\right)$$

A value of i in in the formula 1.4 may be 0, or may be a sequence number of a time unit in which the PUSCH information is previously transmitted. The value 0 of i represents a sequence number of a time unit used to transmit the initially transmitted random access message.

Optionally, in some other embodiments, the total PUSCH power ramped after the adjustment may be a smaller value in a headroom of a power that can be ramped for the PUSCH and a reference ramp power.

In other words, the total PUSCH power ramped after the adjustment may be determined according to the following formula:

(Formula 1.5)

$$\Delta P_{rampup,b,f,c} = \min\left[\left\{\max\left(0, P_{CMAX,f,c} - \begin{pmatrix} 10\log_{10}(2^{\mu}\cdot M_{RB,b,f,c}^{PUSCH}(i)) \\ +P_{O_{PUSCH},b,f,c}(j) + \alpha_{b,f,c}(j)\cdot PL_c \\ +\Delta_{TF,b,f,c}(i) \end{pmatrix}\right)\right\}, \Delta P_{power\_ramp2}\right] \text{ where}$$

$$\max\left(0, P_{CMAX,f,c} - \begin{pmatrix} 10\log_{10}(2^{\mu}\cdot M_{RB,b,f,c}^{PUSCH}(i)) \\ +P_{O_{PUSCH},b,f,c}(j) + \alpha_{b,f,c}(j)\cdot PL_c \\ +\Delta_{TF,b,f,c}(i) \end{pmatrix}\right)$$

is the headroom of the power that can be ramped for the PUSCH, $\Delta_{power\_ramp2}$ is the reference ramp power, and $P_{CMAX,f,c}$ represents a maximum transmit power that is configured for the terminal device in a transmission time unit i. The reference ramp power can be equal to a quantity of retransmission times multiplied by the PUSCH power ramp step. $PL_c$ is an estimated downlink path loss. $PL_c$ may be the same as or different from $PL_{b,f,c}$ in the formula 1.1 and the formula 1.2. Meanings of parameters other than $\Delta_{power\_ramp2}$, $P_{CMAX,f,c}$, and $PL_c$ in the formula 1.5 are the same as meanings of parameters in the formula 1.1 and the formula 1.2. Details are not described herein again.

Optionally, in some embodiments, the reference ramp power may be equal to a quantity of actual retransmission times multiplied by the PUSCH power ramp step.

Optionally, in some other embodiments, the reference ramp power may be equal to the maximum quantity of retransmission times multiplied by the PUSCH power ramp step.

$$\max\left(0, P_{CMAX,f,c} - \begin{pmatrix} 10\log_{10}(2^{\mu}\cdot M_{RB,b,f,c}^{PUSCH}(i)) \\ +P_{O_{PUSCH},b,f,c}(j) + \alpha_{b,f,c}(j)\cdot PL_c \\ +\Delta_{TF,b,f,c}(i) \end{pmatrix}\right)$$

Similarly, a value of i in in the formula 1.5 may be 0, or may be a sequence number of a time unit in which the PUSCH information is previously transmitted. The value 0 of i represents a sequence number of a time unit used to transmit the initially transmitted random access message.

A power ramp step (such as the random access preamble power ramp step and PUSCH power ramp step) indicates a power to be increased for each time of retransmission.

Optionally, in some embodiments, the random access preamble power ramp step and PUSCH power ramp step may be not equal. Optionally, in some other embodiments, the random access preamble power ramp step and PUSCH power ramp step may be equal.

Optionally, in some embodiments, the PUSCH power ramp step may be the same as the random access preamble power ramp step. In this case, the terminal device does not need to obtain the PUSCH power ramp step, and may directly use the random access preamble power ramp step as the PUSCH power ramp step.

Optionally, in some other embodiments, the terminal device receives the PUSCH power ramp step sent by the access network device.

Optionally, in some embodiments, the terminal device may determine that the random access preamble power ramp step (which, for example, may be referred to as a first power ramp step) in the two-step random access procedure is the same as a random access preamble power ramp step (which, for example, may be referred to as a second power ramp step) in a four-step random access procedure. In other words, in this case, the terminal device may not need to determine whether a first time-frequency resource is the same as a second time-frequency resource, but may directly determine that the first power ramp step is equal to the second power ramp step. For example, the terminal device may receive configuration information of the first power ramp step and configuration information of the second power ramp step from the network device.

Optionally, in some other embodiments, the terminal device determines that the first power ramp step is a sum of the second power ramp step and a power ramp step offset value. In other words, in this case, the terminal device may not need to determine whether the first time-frequency resource is the same as the second time-frequency resource, but may directly determine that the first power ramp step is the sum of the second power ramp step and the power ramp step offset value. For example, the network device may include only the power ramp step offset value in the configuration information that is of the two-step random access procedure and that is sent to the terminal device. When performing the two-step random access procedure, the terminal device determines the first power ramp step based on the power ramp step offset value and the second power ramp step.

In some possible implementations, the methods for determining the random access preamble power ramp step and determining the PUSCH power ramp step may be applied to the method shown in the embodiments of this application.

In some other possible implementations, the methods for determining the random access preamble power ramp step and determining the PUSCH power ramp step may alternatively be applied to the existing two-step random access procedure. In other words, all other steps in the two-step random access procedure except the step of determining the random access preamble power ramp step and the step of determining the PUSCH power ramp step may be the same as those in the current technology.

Optionally, in some embodiments, a beam used by the terminal device to retransmit the random access preamble may be the same as or different from a beam used to previously transmit the random access preamble. For ease of description, in the following descriptions, the beam used to retransmit the random access preamble is referred to as a first beam, and the beam used to previously transmit the random access preamble is referred to as a second beam. It may be understood that the previous transmission is previous transmission of the retransmission. For example, assuming that the retransmission is transmitting the random access preamble for an $N_{repeat}{}^{th}$ time, the previous transmission is transmitting the random access preamble for an $(N_{repeat}-1)^{th}$ time, where $N_{repeat}$ is a positive integer greater than or equal to 2. It should be noted that retransmission of a random access preamble may be retransmission of a random access preamble previously sent, or may be transmission of a random access preamble different from a random access preamble previously transmitted, but the transmission of the random access preamble this time and the previous transmission of the random access preamble are considered to belong to a same random access procedure.

Optionally, in some embodiments, a beam used by the terminal device to retransmit the PUSCH information may be the same as or different from a beam used by the terminal device to previously transmit the PUSCH information. For ease of description, in the following descriptions, the beam used to retransmit the PUSCH information is referred to as a third beam, and the beam used to previously transmit the PUSCH information is referred to as a fourth beam. It may be understood that the previous transmission is previous transmission of the retransmission. For example, assuming that the retransmission is transmitting the PUSCH information for an $N_{repeat}{}^{th}$ time, the previous transmission is transmitting the PUSCH information for an $(N_{repeat}-1)^{th}$ time, where $N_{repeat}$ is a positive integer greater than or equal to 2.

Optionally, in some embodiments, a quantity of PUSCH power ramping times may be the same as a quantity of random access preamble power ramping times. In other words, in an $N^{th}$ time of retransmission, a transmit power of the PUSCH information and a random access preamble transmit power may be represented as:

$$P_{PRACH}^{N} = P_{O,pre} + M_{2-pre}^{N} \times \Delta P_{2-pre} \quad \text{Formula 5.1}$$

$$P_{PUSCH}^{N} = P_{O,PUSCH} + M_{2-PUSCH}^{N} \times \Delta P_{2-PUSCH} \quad \text{Formula 5.2}$$

where $P^{N}{}_{PRACH}$ represents the random access preamble transmit power in the $N^{th}$ time of retransmission, $P_{O,pre}$ represents an initial random access preamble transmit power, $\Delta P_{2-pre}$ represents the random access preamble power ramp step, $P^{N}{}_{PUSCH}$ represents the transmit power of the PUSCH information in the $N^{th}$ time of retransmission, $P_{O,PUSCH}$ represents an initial transmit power of the PUSCH information, $\Delta P_{2-PUSCH}$ represents the PUSCH information power ramp step, $$M_{2-pre}^{N}$$

represents a quantity of power ramping times of the random access preamble in N retransmission times, and $$M_{2-PUSCH}^{N}$$

represents a quantity of power ramping times of the PUSCH information in the N retransmission times. N is a positive integer greater than or equal to 1. In a specific implementation, a counter may be used to count the quantity of power ramping times of the random access preamble and the quantity of power ramping times of the PUSCH information, that is, values on the counter are used to represent $$M_{2-pre}^{N} \text{ and } M_{2-PUSCH}^{N}.$$

In some embodiments, if the first beam is different from the second beam, and the third beam is different from the fourth beam, the terminal device may not ramp the random access preamble transmit power and the transmit power of the PUSCH information. In other words, if a beam for transmitting the PUSCH information for an $N^{th}$ time is different from a beam for transmitting the PUSCH information for an $(N+1)^{th}$ time, and a beam for transmitting the random access preamble for the $N^{th}$ time is different from a beam for transmitting the random access preamble for the $(N+1)^{th}$ time, a transmit power of the PUSCH information in an $(N+1)^{th}$ time of retransmission is still $P^{N}{}_{PUSCH}$ in the formula 5.2, and a random access preamble transmit power in the $(N+1)^{th}$ time of retransmission is still $P^{N}{}_{PRACH}$ in the formula 5.1. In this application, not ramping the transmit power may also be referred to as stopping ramping the transmit power, or interrupting ramping the transmit power. Correspondingly, when a transmit power in current transmission is determined, a value on a power ramping counter remains the same as a value on a power ramping counter used when a transmit power in previous transmission is determined.

In some embodiments, if the first beam is the same as the second beam, and the third beam is the same as the fourth beam, the terminal device may ramp the random access preamble transmit power and the transmit power of the PUSCH information. In other words, if a beam for transmitting the PUSCH information for an $N^{th}$ time is the same as a beam for transmitting the PUSCH information for an $(N+1)^{th}$ time, and a beam for transmitting the random access preamble for the $N^{th}$ time is the same as a beam for transmitting the random access preamble for the $(N+1)^{th}$ time, a random access preamble transmit power and a transmit power of the PUSCH information in an $(N+1)^{th}$ time of retransmission are:

$$P_{PRACH}^{N+1} = P_{O,pre} + (M_{2-pre}^{N} + 1) \times \Delta P_{2-pre} \quad \text{Formula 5.3}$$

$$P_{PUSCH}^{N+1} = P_{O,PUSCH} + (M_{2-PUSCH}^{N} + 1) \times \Delta P_{2-PUSCH} \quad \text{Formula 5.4}$$

where $P^{N+1}_{PUSCH}$ is the transmit power of the PUSCH information in the $(N+1)^{th}$ time of retransmission, and $P^{N+1}_{PRACH}$ is the random access preamble transmit power in the $(N+1)^{th}$ time of retransmission. Meanings of $P_{O,\ pre}$, $\Delta P_{2-pre}$, $P_{O,\ PUSCH}$, and $\Delta P_{2-PUSCH}$ are the same as those in the formula 5.1 and the formula 5.2. Details are not described herein again. Using $$M_{2-pre}^{N+1}$$

to represent the quantity of power ramping times of the random access preamble in the $(N+1)^{th}$ time of retransmission, and $$M_{2-PUSCH}^{N+1}$$

to represent the quantity of power ramping times of the PUSCH information in the $(N+1)^{th}$ time of retransmission, the formulas 5.3 and 5.4 respectively correspond to $$M_{2-pre}^{N+1} = M_{2-pre}^{N} + 1 \text{ and } M_{2-PUSCH}^{N+1} = M_{2-PUSCH}^{N} + 1.$$

Optionally, in some embodiments, a quantity of PUSCH power ramping times may be different from a quantity of random access preamble power ramping times. In other words, when the random access preamble is retransmitted for an ${N_1}^{th}$ time, the PUSCH information may be retransmitted for an ${N_2}^{th}$ time, where $N_1$ and $N_2$ are positive integers greater than or equal to 1, and $N_1$ and $N_2$ may be the same or may be different.

Specifically, if the first beam is different from the second beam, and the third beam is different from the fourth beam, the terminal device may not ramp the random access preamble transmit power and the transmit power of the PUSCH information, that is, $$M_{2-pre}^{N+1} = M_{2-pre}^{N} \text{ and } M_{2-PUSCH}^{N+1} = M_{2-PUSCH}^{N}.$$

If the first beam is different from the second beam, but the third beam is the same as the fourth beam, the terminal device may not ramp the random access preamble transmit power, but ramp the transmit power of the PUSCH information, that is, $$M_{2-pre}^{N+1} = M_{2-pre}^{N} \text{ and } M_{2-PUSCH}^{N+1} = M_{2-PUSCH}^{N} + 1.$$

For example, if a beam for transmitting the random access preamble for an $N^{th}$ time is different from a beam for transmitting the random access preamble for an $(N+1)^{th}$ time, and a beam for transmitting the PUSCH information for the $N^{th}$ time is the same as a beam for transmitting the PUSCH information for the $(N+1)^{th}$ time, a random access preamble transmit power in an $(N+1)^{th}$ time of retransmission may still be $P^{N}_{PRACH}$ in the formula 5.1, but a transmit power of the PUSCH information in the $(N+1)^{th}$ time of retransmission is changed to $P^{N+1}_{PUSCH}$ in the formula 5.4.

If the first beam is the same as the second beam, but the third beam is different from the fourth beam, the terminal device may ramp the random access preamble transmit power, but does not ramp the transmit power of the PUSCH information, that is, $$M_{2-pre}^{N+1} = M_{2-pre}^{N} + 1 \text{ and } M_{2-PUSCH}^{N+1} = M_{2-PUSCH}^{N}.$$

For example, if a beam for transmitting the random access preamble for an $N^{th}$ time is the same as a beam for transmitting the random access preamble for an $(N+1)^{th}$ time, and a beam for transmitting the PUSCH information for the $N^{th}$ time is different from a beam for transmitting the PUSCH information for the $(N+1)^{th}$ time, a random access preamble transmit power in an $(N+1)^{th}$ time of retransmission is changed to $P^{N+1}_{PRACH}$ in the formula 5.3, but a transmit power of the PUSCH information in the $(N+1)^{th}$ time of retransmission may still be $P^{N}_{PUSCH}$ in the formula 5.2.

In some embodiments, if the first beam is the same as the second beam, and the third beam is the same as the fourth beam, the terminal device may ramp the random access preamble transmit power and the transmit power of the PUSCH information.

In some embodiments, if the first beam is different from the second beam, and the third beam is different from the fourth beam, the terminal device may not ramp the random access preamble transmit power and the transmit power of the PUSCH information, that is, $$M_{2-pre}^{N+1} = M_{2-pre}^{N} \text{ and } M_{2-PUSCH}^{N+1} = M_{2-PUSCH}^{N}.$$

In some embodiments, beams used to send the random access preamble and the PUSCH information are the same. For example, the first beam is the same as the third beam, and the second beam is the same as the fourth beam. Whether to ramp the random access preamble transmit power and the transmit power of the PUSCH information may be determined depending on whether the first beam is the same as the second beam. If the first beam is the same as the second beam, the terminal device may ramp the random access preamble transmit power and the transmit power of the PUSCH information. If the first beam is different from the second beam, the terminal may not ramp the random access preamble transmit power and the transmit power of the PUSCH information.

In some embodiments, if the network device successfully detects the preamble in the random access message, but fails to decode the PUSCH information in the random access message, the network device may send a response message for the preamble to the terminal device, where the response message carries a power control parameter. The terminal device may retransmit the PUSCH information based on an uplink grant in the response message. The terminal device may determine, based on the beam used to retransmit the PUSCH information and/or the power control parameter, a transmit power used to retransmit the PUSCH information. In an implementation, the transmit power used to retransmit the PUSCH information is determined based on the power control parameter and a transmit power used to previously transmit the PUSCH information. For example, assuming that the retransmission of the PUSCH information based on the uplink grant is an $(N+1)^{th}$ time of retransmission of the PUSCH information, the transmit power used to retransmit the PUSCH information based on the uplink grant is $$P_{PUSCH}^{N+1} = P_{PUSCH}^{N} + \Delta_{TPC},$$

where $\Delta_{TPC}$ is a value determined based on the power control parameter, and $P^{N}_{PUSCH}$ is the transmit power used to transmit the PUSCH information for the $(N+1)^{th}$ time. In another implementation, the transmit power used to retransmit the PUSCH information is determined based on the power control parameter and the beam used to retransmit the PUSCH information. If the beam for retransmitting the PUSCH information is the same as a beam for previously transmitting the PUSCH information, the transmit power of the PUSCH information may be ramped, that is, $$M_{2-PUSCH}^{N+1} = M_{2-PUSCH}^{N} + 1.$$

The power used to retransmit the PUSCH information is as follows:

$$P_{PUSCH}^{N+1} = P_{O,PUSCH} + \left(M_{2-PUSCH}^{N} + 1\right) \times \Delta P_{2-PUSCH} + \Delta_{TPC}.$$

In an optional implementation, if the beam for retransmitting the PUSCH information is the same as a beam for previously transmitting the PUSCH information, the transmit power of the PUSCH information may not be ramped. For example, $$M_{2-PUSCH}^{N+1} = M_{2-PUSCH}^{N}.$$

The transmit power used to retransmit the PUSCH information is as follows:

$$P_{PUSCH}^{N+1} = P_{O,PUSCH} + M_{2-PUSCH}^{N} \times \Delta P_{2-PUSCH} + \Delta_{TPC}.$$

Same or different power ramping counters are set for the random access preamble and the PUSCH, to record the quantity of power ramping times of the random access preamble and the quantity of power ramping times of the PUSCH information. This enables flexible power ramping of the random access message, increases a transmission success rate, and reduces a transmission delay.

In some possible implementations, the methods for determining whether to ramp the random access preamble transmit power and determining whether to ramp the transmit power of the PUSCH information may be applied to the method shown in the embodiments of this application.

In some other possible implementations, the methods for determining whether to ramp the random access preamble transmit power and determining whether to ramp the transmit power of the PUSCH information may alternatively be applied to the existing two-step random access procedure. In other words, all other steps in the two-step random access procedure except the step of determining whether to ramp the random access preamble transmit power and the step of determining whether to ramp the transmit power of the PUSCH information may be the same as those in the current technology.

As described above, when the random access message is the retransmitted random access message and the random access message further includes the random access preamble (that is, the random access message is the second-type retransmitted random access message), the first candidate uplink transmit power may be calculated by using the formula 1.2. If the random access message is the second-type retransmitted random access message, the power control adjustment amount $f_{b,f,c}(i)$ in the formula 1.2 may be calculated by using the formula 1.3, and the total PUSCH power ramped after the adjustment in the formula 1.3 may be determined according to the formula 1.4 or the formula 1.5. A method for calculating the total PUSCH power ramped after the adjustment may be preset in the terminal device. In other words, in some embodiments, in the terminal device, the formula 1.4 may be preset to calculate the total PUSCH power ramped after the adjustment. In some other embodiments, in the terminal device, the formula 1.5 may be preset to calculate the total PUSCH power ramped after the adjustment.

Optionally, in some other embodiments, when the random access message is retransmitted and the random access message does not include the random access preamble (that is, the random access message is the first-type retransmitted random access message), that the terminal device determines a first candidate uplink transmit power based on the MCS compensation factor may include: The terminal device determines the target power. The terminal device determines the power control adjustment amount, where the value of the power control adjustment amount is greater than 0. The terminal device determines the first candidate uplink transmit power based on the target power, the power control adjustment amount, and the MCS compensation factor. The terminal device may determine the first candidate uplink transmit power according to the formula 1.2.

Optionally, in some embodiments, if the random access message is the first-type random access message, the terminal device may determine an initial power control adjustment amount based on the target-power ramp step and the quantity of times that the random access message has been retransmitted, where the target-power ramp step may be a random access preamble power ramp step or a PUSCH power ramp step; and then determine the power control adjustment amount based on the initial power control adjustment amount and transmit power adjustment indication information carried in a random access response.

Optionally, in some embodiments, if the random access message is the first-type retransmitted random access mes sage, the terminal device may determine the power control adjustment amount according to the following formula:

$$f_{b,f,c}(i) = \Delta P_{rampup,b,f,c} + \delta_{MsgB,b,f,c} \quad \text{(Formula 1.6)}$$

where $f_{b,f,c}(i)$ represents the power control adjustment amount, $\Delta P_{rampup,b,f,c}$ represents the initial power control adjustment amount, and $\delta_{MsgB,b,f,c}$ represents the transmit power adjustment indication information carried in the random access response of the message B.

Optionally, in some embodiments, the initial power control adjustment amount may be a smaller value in the headroom of the power that can be ramped for the PUSCH and the total random access preamble ramp power. In other words, the total PUSCH power ramped after the adjustment may be determined according to the following formula:

(Formula 1.7)

$$\Delta P_{rampup,b,f,c} = \min\left\{\left[\max\left(0,\ P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) \end{array}\right)\right)\right], \Delta P'_{rampuprequested,b,f,c}\right\} \text{ where}$$

$$\max\left(0,\ P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) \end{array}\right)\right)$$

is the headroom of the power that can be ramped for the PUSCH, $\Delta P'_{rampuprequested,b,f,c}$ is the total random access preamble ramp power, $P_{CMAX,f,c}$ represents a maximum transmit power that is configured for the terminal device in a transmission time unit i, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.7 are the same as meanings of parameters in the formula 1.1 and the formula 1.2. Details are not described herein again.

Optionally, in some embodiments, the total random access preamble ramp power indicates a power that is increased for the random access preamble from initial transmission to the previous transmission. The random access preamble ramp power may be equal to a quantity of actual retransmission times multiplied by the random access preamble power ramp step.

Optionally, in some other embodiments, the total random access preamble ramp power indicates a total power increased for the random access preamble. The total increased power is equal to the maximum quantity of retransmission times multiplied by the random access preamble power ramp step. The maximum quantity of retransmission times may be configured by the access network device, or may be a preset value.

Similarly, a value of i in $$\max\left(0,\ P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) \end{array}\right)\right)$$

in the formula 1.7 may be 0, or may be a sequence number of a time unit in which the PUSCH information is previously transmitted. The value 0 of i represents a sequence number of a time unit used to transmit the initially transmitted random access message.

Optionally, in some other embodiments, the initial power control adjustment amount may be a smaller value in the headroom of the power that can be ramped for the PUSCH and the reference ramp power. In other words, the initial power control adjustment amount may be determined according to the formula 1.5.

Optionally, in some other embodiments, if the random access message is the first-type retransmitted random access message, the terminal device may determine the power control adjustment amount according to the following formula:

$$f_{b,f,c}(i) = \Delta P'_{rampup,b,f,c} + \delta_{MsgB,b,f,c} + \omega_{present} \quad \text{(Formula 1.8)}$$

where $f_{b,f,c}(i)$ represents the power control adjustment amount, $\Delta P'_{rampup,b,f,c}$ represents the initial power control adjustment amount, $\delta_{MsgB,b,f,c}$ represents the transmit power adjustment indication information carried in the random access response of the message B, and $\omega_{preseent}$ represents a pre-configured power offset value.

Optionally, in some embodiments, the initial power control adjustment amount in the formula 1.8 may be a smaller value in the headroom of the power that can be ramped for the PUSCH and the total random access preamble ramp power. In other words, the initial power control adjustment amount may be determined according to the following formula:

(Formula 1.9)

$$\Delta P'_{rampup,b,f,c} = \min\left\{\left[\max\left(0,\ P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)\right], \Delta P'_{rampuprequested,b,f,c}\right\} \text{ where}$$

$$\max\left(0,\ P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)$$

is the headroom of the power that can be ramped for the PUSCH, $\Delta P'_{rampuprequested,b,f,c}$ is the total random access preamble ramp power, $P_{CMAX,f,c}$ represents a maximum transmit power that is configured for the terminal device in a transmission time unit i, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.9 are the same as meanings of parameters in the formula 1.1 and the formula 1.2. Details are not described herein again.

Optionally, in some embodiments, the random access preamble ramp power indicates a power that is increased for the random access preamble from initial transmission to the previous transmission. The random access preamble ramp power may be equal to a quantity of actual retransmission times multiplied by the random access preamble power ramp step.

Optionally, in some other embodiments, the random access preamble ramp power indicates a total power increased for the random access preamble. The total increased power is equal to the maximum quantity of retransmission times multiplied by the random access preamble power ramp step. The maximum quantity of retransmission times may be configured by the access network device, or may be a preset value.

Similarly, a value of i in $$\max\left(0, P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)$$

in the formula 1.9 may be 0, or may be a sequence number of a time unit in which the PUSCH information is previously transmitted. The value 0 of i represents a sequence number of a time unit used to transmit the initially transmitted random access message.

Optionally, in some embodiments, the initial power control adjustment amount in the formula 1.8 may be calculated according to the following formula:

(Formula 1.10)

$$\Delta P'_{rampup,b,f,c} = \min\left[\left\{\max\left(0, P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)\right\}, \Delta_{power\_ramp2}\right] \text{ where}$$

$$\max\left(0, P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)$$

is the headroom of the power that can be ramped for the PUSCH, $\Delta_{power\_ramp2}$ is the reference ramp power, $P_{CMAX,f,c}$ represents a maximum transmit power that is configured for the terminal device in a transmission time unit i, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.10 are the same as meanings of parameters in the formula 1.1 and the formula 1.2. Details are not described herein again.

Optionally, in some embodiments, the reference ramp power may be equal to a quantity of actual retransmission times multiplied by the PUSCH power ramp step.

Optionally, in some other embodiments, the reference ramp power may be equal to the maximum quantity of retransmission times multiplied by the PUSCH power ramp step.

Similarly, a value of i in $$\max\left(0, P_{CMAX,f,c} - \left(\begin{array}{l} 10\log_{10}\left(2^{\mu}\cdot M_{RB,b,f,c}^{PUSCH}(i)\right) \\ +P_{O_{PUSCH},b,f,c}(j) + \alpha_{b,f,c}(j)\cdot PL_c \\ +\Delta_{TF,b,f,c}(i) + \delta_{MsgB,b,f,c} + \omega_{present} \end{array}\right)\right)$$

in the formula 1.10 may be 0, or may be a sequence number of a time unit in which the PUSCH information is previously transmitted. The value 0 of i represents a sequence number of a time unit used to transmit the initially transmitted random access message.

Optionally, in some other embodiments, if the random access message is the first-type retransmitted random access message, the terminal device may determine the power control adjustment amount according to the following formula:

$$f_{b,f,c}(i) = \left(\Delta P'_{rampup,b,f,c} + \delta_{MsgB,b,f,c}\right)\cdot\gamma_{pro} \quad \text{(Formula 1.11)}$$

where $f_{b,f,c}(i)$ represents the power control adjustment amount, $\Delta P'_{rampup,b,f,c}$ represents the initial power control adjustment amount, $\delta_{MsgB,b,f,c}$ represents the transmit power adjustment indication information carried in the random access response of the message B, and $\gamma_{pro}$ represents a pre-configured power gain value.

Optionally, in some embodiments, the initial power control adjustment amount in the formula 1.11 may be a smaller value in the headroom of the power that can be ramped for the PUSCH and the total random access preamble ramp power. In other words, the initial power control adjustment amount may be determined according to the following formula:

(Formula 1.12)

$$\Delta P'_{rampup,b,f,c} = \min\left[\left\{\max\left(0, \frac{1}{\gamma_{pro}}\left(P_{CMAX,f,c} - \left(\begin{array}{l} 10\log_{10}\left(2^{\mu}\cdot M_{RB,b,f,c}^{PUSCH}(i)\right) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)\right)\right\}, \Delta P'_{rampuprequested,b,f,c}\right]$$

$$\text{where } \max\left(0, \frac{1}{\gamma_{pro}}\left(P_{CMAX,f,c} - \left(\begin{array}{l} 10\log_{10}\left(2^{\mu}\cdot M_{RB,b,f,c}^{PUSCH}(i)\right) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)\right)$$

is the headroom of the power that can be ramped for the PUSCH, $\Delta P_{rampuprequested,b,f,c}$ is the total random access preamble ramp power, $P_{CMAX,f,c}$ represents a maximum transmit power that is configured for the terminal device in a transmission time unit i, the total random access preamble ramp power is a total power ramped for the random access preamble from initial transmission to successful transmission, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.12 are the same as meanings of parameters in the formula 1.1 and the formula 1.2. Details are not described herein again.

Similarly, a value of i in $$\max\left(0, \frac{1}{\gamma_{pro}}\left(P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)\right)$$

in the formula 1.12 may be 0, or may be a sequence number of a time unit in which the PUSCH information is previously transmitted. The value 0 of i represents a sequence number of a time unit used to transmit the initially transmitted random access message.

Optionally, in some embodiments, the initial power control adjustment amount in the formula 1.11 may be calculated according to the following formula:

$$\Delta P'_{rampup,b,f,c} = \min\left[\left\{\max\left(0, \frac{1}{\gamma_{pro}}\left(P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)\right)\right\}, \Delta_{power\_ramp2}\right] \quad \text{(Formula 1.13)}$$

where $\max\left(0, \frac{1}{\gamma_{pro}}\left(P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)\right)$ is the headroom of the power that can be ramped for the PUSCH, $\Delta_{power\_ramp2}$ is the reference ramp power, $P_{CMAX,f,c}$ represents a maximum transmit power that is configured for the terminal device in a transmission time unit i, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.13 are the same as meanings of parameters in the formula 1.1 and the formula 1.2. Details are not described herein again.

Similarly, a value of i in $$\max\left(0, \frac{1}{\gamma_{pro}}\left(P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)\right)$$

in the formula 1.13 may be 0, or may be a sequence number of a time unit in which the PUSCH information is previously transmitted. The value 0 of i represents a sequence number of a time unit used to transmit the initially transmitted random access message.

Optionally, in some embodiments, the reference ramp power may be equal to a quantity of actual retransmission times multiplied by the PUSCH power ramp step.

Optionally, in some other embodiments, the reference ramp power may be equal to the maximum quantity of retransmission times multiplied by the PUSCH power ramp step.

Optionally, in some other embodiments, if the random access message is the first-type retransmitted random access message, the terminal device may determine the power control adjustment amount according to the following formula:

$$f_{b,f,c}(i) = \Delta P'_{rampup,b,f,c} + \delta_{MsgB,b,f,c}\cdot\gamma_{pro} \quad \text{(Formula 1.14)}$$

where $f_{b,f,c}(i)$ represents the power control adjustment amount, $\Delta P'_{rampup,b,f,c}$, represents the initial power control adjustment amount, and $\delta_{MsgB,b,f,c}$ represents the transmit power adjustment indication information carried in the random access response of the message B.

Optionally, in some embodiments, the initial power control adjustment amount in the formula 1.14 may be a smaller value in the headroom of the power that can be ramped for the PUSCH and the total random access preamble ramp power. In other words, the initial power control adjustment amount may be determined according to the following formula:

$$\Delta P'_{rampup,b,f,c} = \min\left[\left\{\max\left(0, \left(P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)\right)\right\}, \Delta P'_{rampuprequested,b,f,c}\right] \quad \text{(Formula 1.15)}$$

where $\max\left(0, P_{CMAX,f,c} - \left(\begin{array}{l}10\log_{10}(2^{\mu}\cdot M_{RB,b,f,c}^{PUSCH}(i)) + \\ P_{O_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro}\end{array}\right)\right)$ is the headroom of the power that can be ramped for the PUSCH, $\Delta P'_{rampuprequested,b,f,c}$ is the total random access preamble ramp power, $P_{CMAX,f,c}$ represents a maximum transmit power that is configured for the terminal device in a transmission time unit i, the total random access preamble ramp power is a total power ramped for the random access preamble from initial transmission to successful transmission, and $PL_c$ is an estimated downlink path loss. $PL_c$ may be the same as or different from $PL_{b,f,c}$ in the formula 1.1 and the formula 1.2. Meanings of parameters other than $\Delta P'_{rampuprequested,b,f,c}$, $P_{CMAX,f,c}$, and $PL_c$ in the formula 1.15 are the same as meanings of parameters in the formula 1.1 and the formula 1.2. Details are not described herein again.

Similarly, a value of i in $$\max\left(0,\ P_{CMAX,f,c} - \left(\begin{array}{c} 10\log_{10}\left(2^{\mu}\cdot M_{RB,b,f,c}^{PUSCH}(i)\right) + \\ P_{0_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)$$

in the formula 1.15 may be 0, or may be a sequence number of a time unit in which the PUSCH information is previously transmitted. The value 0 of i represents a sequence number of a time unit used to transmit the initially transmitted random access message.

Optionally, in some other embodiments, the initial power control adjustment amount in the formula 1.14 may be determined according to the following formula:

$$\Delta P'_{rampup,b,f,c} = \min\left[\left\{\max\left(0,\ \left(P_{CMAX,f,c} - \left(\begin{array}{c} 10\log_{10}\left(2^{\mu}\cdot M_{RB,b,f,c}^{PUSCH}(i)\right) + \\ P_{0_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)\right)\right\},\ \Delta_{power\_ramp2}\right] \quad \text{(Formula 1.16)}$$

where $\max\left(0,\ P_{CMAX,f,c} - \left(\begin{array}{c} 10\log_{10}\left(2^{\mu}\cdot M_{RB,b,f,c}^{PUSCH}(i)\right) + \\ P_{0_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)$ is the headroom of the power that can be ramped for the PUSCH, $\Delta_{power\_ramp2}$ is the reference ramp power, the reference ramp power may be equal to a quantity of retransmission times multiplied by the PUSCH power ramp step, $P_{CMAX,f,c}$ represents a maximum transmit power that is configured for the terminal device in a transmission time unit i, and $PL_c$ is an estimated downlink path loss. $PL_c$ may be the same as or different from $PL_{b,f,c}$ in the formula 1.1 and the formula 1.2. Meanings of parameters other than $\Delta P_{rampuprequested,b,f,c}$, $P_{CMAX,f,c}$, and $PL_c$ in the formula 1.16 are the same as meanings of parameters in the formula 1.1 and the formula 1.2. Details are not described herein again.

Optionally, in some embodiments, the reference ramp power may be equal to a quantity of actual retransmission times multiplied by the PUSCH power ramp step.

Optionally, in some other embodiments, the reference ramp power may be equal to the maximum quantity of retransmission times multiplied by the PUSCH power ramp step.

Similarly, a value of i in $$\max\left(0,\ P_{CMAX,f,c} - \left(\begin{array}{c} 10\log_{10}\left(2^{\mu}\cdot M_{RB,b,f,c}^{PUSCH}(i)\right) + \\ P_{0_{PUSCH},b,f,c}(j) + \alpha_{b,f,c}(j)\cdot PL_c + \\ \Delta_{TF,b,f,c}(i) + \delta_{MsgB,b,f,c}\cdot\gamma_{pro} \end{array}\right)\right)$$

in the formula 1.16 may be 0, or may be a sequence number of a time unit in which the PUSCH information is previously transmitted. The value 0 of i represents a sequence number of a time unit used to transmit the initially transmitted random access message.

Optionally, in some embodiments, $P_{CMAX,f,c}$ in the formula 1.4, the formula 1.5, the formula 1.7, the formula 1.9, the formula 1.10, the formula 1.12, the formula 1.13, the formula 1.15, and the formula 1.16 may be a fixed value. In other words, a value of $P_{CMAX,f,c}$ is uncorrelated with the sequence number i of the time unit used to transmit the PUSCH.

Optionally, in some other embodiments, $P_{CMAX,f,c}$ in the formula 1.4, the formula 1.5, the formula 1.7, the formula 1.9, the formula 1.10, the formula 1.12, the formula 1.13, the formula 1.15, and the formula 1.16 may be a variable value. $P_{CMAX,f,c}$ may be correlated with the sequence number i of the time unit used to transmit the PUSCH. For example, $P_{CMAX,f,c}$ may be positively correlated with the sequence number i of the time unit used to transmit the PUSCH. That is, a larger value of i indicates a larger value of $P_{CMAX,f,c}$. In this case, $P_{CMAX,f,c}$ may be represented as $P_{CMAX,f,c}(i)$.

Optionally, in some embodiments, that the terminal device determines a target power based on the first power offset parameter or the second power offset parameter includes: When the random access message includes only the PUSCH information, the terminal device determines the target power based on the first power offset parameter. When the random access message includes the PUSCH information and the random access preamble, the terminal device determines the target power based on the second power offset parameter.

Optionally, in some embodiments, the target power may be a sum of the configured initial target power and the first power offset parameter. In an implementation, the configured initial target power may be an initial target power of the random access preamble in the random access message. In another implementation, the initial target power may be different from an initial target power of the random access preamble in the random access message.

Optionally, the first power offset parameter may be a power offset between the PUSCH in the random access message and the random access preamble in the random access message.

Optionally, in some other embodiments, the target power may be a sum of an initial target power and the second power offset parameter.

Optionally, in some embodiments, the second power offset parameter may be a sum of a power transmission offset parameter correction value and a power offset between the PUSCH in the random access message and the random access preamble in the random access message. In this case, the terminal device may determine the target power according to the following formula:

$$P_{O_{PUSCH},b,f,c}(j) = P_{O\_PRE} + \Delta_{PREAMBLE\_MsgA} + \Delta_{Asyn} \quad \text{(Formula 1.17)}$$

where $P_{O_{PRUCH},b,f,c}$(j) represents the target power, $P_{O\_PRE}$ represents the configured initial target power, $A\Delta P_{REAMBLE\_MsgA}$ represents the power offset between the PUSCH in the random access message and the random access preamble in the random access message, and $\Delta_{Asyn}$ represents the power transmission offset parameter correction value. $\Delta_{Asyn}$ is greater than or equal to 0. Meanings of j, f, and c are the same as meanings of those in the formula 1.1 and the formula 1.2. Details are not described herein again.

$\Delta_{Asyn}$ is a power offset parameter correction value selected by the access network device from a power offset parameter correction value set. Specifically, the access network device may select a power offset parameter correction value from a preset power offset parameter correction value set, and send the selected power offset parameter correction value to the terminal device. The power offset parameter correction value set may include a plurality of power offset parameter correction values. Optionally, in some embodiments, the power offset parameter correction value set may be {0 dB, 2 dB, 4 dB, 6 dB}, where 0 dB, 2 dB, 4 dB, and 6 dB are four power offset parameter correction values included in the power offset parameter correction value set. For another example, in some other embodiments, the power offset parameter correction value set may be {0 dB, 2 dB, 4 dB, 6 dB, 8 dB}, where 0 dB, 2 dB, 4 dB, 6 dB, and 8 dB are five power offset parameter correction values included in the power offset parameter correction value set.

The access network device may select an appropriate power offset parameter correction value from the power offset parameter correction value set according to impact of asynchronous transmission, and send the selected power offset parameter correction value to the terminal device. For example, the access network device may select an appropriate power offset parameter correction value according to a current channel condition. A set {0 dB, 2 dB, 4 dB, 6 dB} is used as an example. If the current channel condition is good, a relatively small power offset parameter correction value, for example, 0 dB or 2 dB, may be selected. If the current channel condition is normal, a relatively larger power offset parameter correction value, for example, 4 dB, may be selected. If the current channel condition is poor, a larger power offset parameter correction value, for example, 6 dB, may be selected.

The initial target power of the random access preamble in the random access message may be configured by the access network device for the terminal device. The power offset between the PUSCH information in the random access message and the random access preamble in the random access message may also be configured by the access network device for the terminal device.

Optionally, in some embodiments, the second power offset parameter may be a product of a power offset parameter correction value and the power offset between the PUSCH in the random access message and the random access preamble in the random access message. In this case, the terminal device may calculate the target power $P_{O_{PRUCH},b,f,c}$(j) according to the following formula:

$$P_{O_{PUSCH},b,f,c}(j) = P_{O\_PRE} + \varepsilon \cdot \Delta_{PREAMBLE\_MsgA} \quad \text{(Formula 1.18)}$$

where $P_{O_{PRUCH},b,f,c}$(j) represents the target power, $P_{O\_PRE}$ represents the initial target power of the random access preamble in the random access message, and $\varepsilon \cdot \Delta_{PREAMBLE\_MsgA}$ represents the power offset that is between the random access message and the random access preamble in the random access message and that is added after asynchronous transmission is considered. More specifically, $\Delta P_{REAMBLE\_MsgA}$ represents the power offset between the random access message and the random access preamble in the random access message, ε represents the power offset parameter correction value, and a value of ε is greater than or equal to 1. Meanings of j, f, and c are the same as meanings of those in the formula 1.1 and the formula 1.2. Details are not described herein again.

Similar to $\Delta_{syn}$, ε may also be a power offset parameter correction value selected by the access network device from the power offset parameter correction value set. Specifically, the access network device may select a power offset parameter correction value from a preset power offset parameter correction value set, and send the selected power transmission offset parameter correction value to the terminal device. The power offset parameter correction value set may include a plurality of power offset parameter correction values. Optionally, in some embodiments, the power offset parameter correction value set may be {1, 1.2, 1.4, 1.6}, where 1, 1.2, 1.4, and 1.6 are four power offset parameter correction values included in the power offset parameter correction value set. For another example, in some other embodiments, the power offset parameter correction value set may be {1, 1.2, 1.4, 1.6, 1.8}, where 1, 1.2, 1.4, 1.6, and 1.8 are five power offset parameter correction values included in the power offset parameter correction value set.

Similarly, the access network device may alternatively select an appropriate power offset parameter correction value from the power offset parameter correction value set according to impact of asynchronous transmission, and send the selected power offset parameter correction value to the terminal device. For example, the access network device may select an appropriate power offset parameter correction value according to a current channel condition. A set {1, 1.2, 1.4, 1.6} is used as an example. If the current channel condition is good, a relatively small power offset parameter correction value, for example, 1 or 1.2, may be selected. If the current channel condition is normal, a relatively larger power offset parameter correction value, for example, 1.4, may be selected. If the current channel condition is poor, a larger power offset parameter correction value, for example, 1.6, may be selected.

Optionally, the access network device configures, for the terminal device, a time-frequency resource used to send a random access channel in a two-step random access procedure (for ease of description, the "time-frequency resource used to send a random access channel in a two-step random access procedure" is referred to as a "first time-frequency resource" for short below) and a time-frequency resource used to send a random access channel in a four-step random access procedure (for ease of description, the "time-frequency resource used to send a random access channel in a four-step random access procedure" is referred to as "a second time-frequency resource" for short below). The access network device may configure one or more first time-frequency resources and one or more second time-frequency resources. In some implementations, any one of the one or more first time-frequency resources is different from any one of the one or more second time-frequency resources. In some other implementations, some of the one or more first time-frequency resources are the same as some of the one or more second time-frequency resources. In some other implementations, the one or more first time-frequency resources are all the same as the one or more second time-frequency resources. When one first time-frequency resource is the same as one second time-frequency resource, the first time-frequency resource or the second time-frequency resource is referred to as a random access channel time-frequency resource shared by the two-step random access procedure and the four-step random access procedure.

In some embodiments, the terminal device may determine, depending on whether a first time-frequency resource is a random access channel time-frequency resource shared by the two-step random access procedure and the four-step random access procedure, initial target power used to send the random access preamble in the two-step random access procedure (for ease of description, the "initial target power used to send a random access preamble in the two-step random access procedure" is referred to as a "first initial target power" for short below) and a random access preamble power ramp step in the two-step random access procedure (for ease of description, the "random access preamble power ramp step in the two-step random access procedure" is referred to as a "first power ramp step" for short below). The first initial target power may be the initial target power $P_{O\_PRE}$ in formula 1.18. The first power ramp step is the random access preamble power ramp step that can be used as the target-power ramp step.

Optionally, in some embodiments, that the terminal device determines the first initial target power and the first power ramp step depending on whether the first time-frequency resource is a random access channel time-frequency resource shared by the two-step random access procedure and the four-step random access procedure includes: When determining that the first time-frequency resource is a random access channel time-frequency resource shared by the two-step random access procedure and the four-step random access procedure, the terminal device determines that the first initial target power is the same as an initial target power used to send a random access channel in the four-step random access procedure (for ease of description, the "initial target power used to send a random access channel in the four-step random access procedure" is referred to as a "second initial target power" for short below), and/or determines that the first power ramp step is the same as a random access preamble power ramp step in the four-step random access procedure (for ease of description, the "random access preamble power ramp step in the four-step random access procedure" is referred to as a "second power ramp step" for short below).

Optionally, in some embodiments, that the terminal device determines the first initial target power and the first power ramp step depending on whether the first time-frequency resource is a random access channel time-frequency resource shared by the two-step random access procedure and the four-step random access procedure includes: The terminal device receives a reference initial target power used to transmit the random access preamble in the two-step random access procedure and a reference power ramp step that are sent by the access network device, determines that the first initial target power is the reference initial target power, and determines that the first power ramp step is the reference power ramp step. In other words, the access network device may directly configure the first initial target power and the first power ramp step for the terminal device. The terminal device may directly use the reference initial target power configured by the access network device as the first initial target power, and use the reference power ramp step configured by the access network device as the first power ramp step.

Optionally, in some embodiments, the terminal device may receive an initial target power offset value and a power ramp step offset value that are sent by the access network device. In this case, that the terminal device determines the first initial target power and the first power ramp step depending on whether the first time-frequency resource is a random access channel time-frequency resource shared by the two-step random access procedure and the four-step random access procedure may include: When determining that the first time-frequency resource is not a random access channel time-frequency resource shared by the two-step random access procedure and the four-step random access procedure, the terminal device may determine the first initial target power based on the initial target power offset value and the second initial target power, and determine the first power ramp step based on the power ramp step offset value and the second power ramp step.

Optionally, in some embodiments, that the terminal device determines the first initial target power based on the initial target power offset value and the second initial target power may include: The terminal device determines that a sum of the initial target power offset value and the second initial target power is the first initial target power.

Assuming that $P_{Pre\_2}$ represents the first initial target power, $P_{Pre\_4}$ represents the second initial target power, and $\Delta_{pre\_24}$ represents the initial target power offset value, $P_{Pre\_2}$, $P_{Pre\_4}$, and $\Delta_{pre\_24}$ satisfy the following relationship:

$$\Delta_{Pre\_24} = P_{Pre\_2} - P_{Pre\_4} \qquad \text{Formula 3.1}$$

Optionally, in some embodiments, that the terminal device determines the first power ramp step based on the power ramp step offset value and the second power ramp step may be: The terminal device determines a sum of the power ramp step offset value and the second power ramp step as the first power ramp step.

Generally, a value range of the initial target power offset value is smaller than a value range of the first initial target power. Similarly, a value range of the power ramp step offset value is smaller than a value range of the first power ramp step. Therefore, compared with a case in which the access network device directly configures the first initial target power and the first power ramp step for the terminal device, a relatively short message may be used when the access network device configures the initial target power offset value and the power ramp step offset value. Therefore, signaling overheads can be reduced.

Optionally, in some embodiments, if the terminal device determines that the first time-frequency resource is not a random access channel time-frequency resource shared by the two-step random access procedure and the four-step random access procedure, but the terminal device does not receive the reference initial target power, the reference power ramp step, the initial target power offset value, and the power ramp step offset value that are sent by the access network device, the terminal device may also determine that the first initial target power is the second initial target power, and determine that the first power ramp step is the second power ramp step.

In conclusion, when the first time-frequency resource is the same as the random access channel time-frequency resource shared by the two-step random access procedure and the four-step random access procedure, power control parameters (namely, the first initial target power and the first power ramp step) of the random access channel used by the terminal device to perform the two-step random access procedure may be the same as power control parameters (that is, the second initial target power and the second power ramp step) of the random access channel used in the four-step random access procedure. When the first time-frequency resource is not the random access channel time-frequency resource shared by the two-step random access procedure and the four-step random access procedure, power control parameters (namely, the first initial target power and the first power ramp step) of the random access channel used by the terminal device to perform the two-step random access procedure may be determined based on power control parameters of the random access channel used in the four-step random access procedure and the offset value configured by the access network device, or power control parameters of the random access channel used in the two-step random access procedure may be directly configured by the access network device. In addition, when the first time-frequency resource is not the random access channel time-frequency resource shared by the two-step random access procedure and the four-step random access procedure, but the access network device does not configure the offset value or the power control parameters of the random access channel used in the two-step random access procedure, the terminal device may also use the power control parameters of the random access channel used in the four-step random access procedure as the power control parameters of the random access channel used in the two-step random access procedure.

Similarly, in addition to the power control parameters (that is, the first initial target power and the first power ramp step) of the random access channel, for some other power control parameters in the two-step random access procedure, also refer to power control parameters in the four-step random access procedure. For ease of description, these power control parameters are collectively referred to as first power control parameters below. The first power control parameters may include at least one of the following parameters: the path loss compensation factor (that is, $\alpha_{b,f,c}(j)$ in the formula 1.2, where for ease of description, the path loss compensation factor is referred to as a "first path loss compensation factor" below), the MCS compensation factor (where for ease of description, the MCS compensation factor is referred to as a "first MCS compensation factor" below), and the power offset between the PUSCH information in the random access message and the random access preamble in the random access message (that is, $\Delta P_{REAMBLE\_MsgA}$ in the formula 1.17, where for ease of description, $\Delta P_{REAMBLE\_MsgA}$ is used below to represent "the power offset between the PUSCH information in the random access message and the random access preamble in the random access message").

Optionally, in some embodiments, when determining that the first time-frequency resource is the same as the random access channel time-frequency resource shared by the two-step random access procedure and the four-step random access procedure, the terminal device determines that the path loss compensation factor is the same as a path loss compensation factor of a message 3 in the four-step random access procedure (where for ease of description, the "path loss compensation factor of a message 3 in the four-step random access procedure" is referred to as a "second path loss compensation factor" below), and/or determines that the MCS compensation factor is the same as an MCS compensation factor in the four-step random access procedure (where for ease of description, the "MCS compensation factor in the four-step random access procedure" is referred to as a "second MCS compensation factor" below), and/or determines that the power offset between the PUSCH information in the random access message and the random access preamble in the random access message is the same as a power offset between the random access preamble and the message 3 in the four-step random access procedure (where for ease of description, $\Delta_{msg3\text{-}preamble}$ is used below to represent the "power offset between a random access preamble and a message 3 in the four-step random access procedure").

In other words, when determining that the first time-frequency resource is the same as the second time-frequency resource, the terminal device may determine that the first path loss compensation factor is the same as the second path loss compensation factor, and/or determine that the first MCS compensation factor is the same as the second MCS compensation factor, and/or determine that $\Delta P_{REAMBLE\_MsgA}$ is the same as $\Delta_{msg3\text{-}preamble}$.

Optionally, in some embodiments, when determining that the first time-frequency resource is not the random access channel time-frequency resource shared by the two-step random access procedure and the four-step random access procedure, the terminal device may determine the first path loss compensation factor based on a path loss compensation factor offset value configured by the access network device and the second path loss compensation factor; and/or determine the first MCS compensation factor based on an MCS compensation factor offset value configured by the access network device and the second MCS compensation factor offset value; and/or determine $\Delta P_{REAMBLE\_MsgA}$ based on a power offset correction value configured by the access network device and $\Delta_{msg3\text{-}preamble}$.

Specifically, a sum of $\Delta_{msg3\text{-}preamble}$ and the power offset correction value is $\Delta P_{REAMBLE\_MsgA}$, that is, $\Delta P_{REAMBLE\_MsgA}$ and $\Delta_{msg3\text{-}preamble}$ satisfy the following formula:

$$\Delta_{PREAMBLE\_MsgA} = \Delta_{msg3-preamble} + \Delta_1 \qquad \text{Formula 3.2}$$

where $\Delta_1$ represents the power offset correction value configured by the access network device.

Similarly, the first path loss compensation factor is a sum of the path loss compensation factor offset value and the second path loss compensation factor. A sum of the MCS compensation factor offset value and the second MCS compensation factor offset value is the first MCS compensation factor.

Optionally, in some possible implementations, alternatively, the access network device may directly configure the first path loss compensation factor, the first MCS compensation factor, and/or $\Delta P_{REAMBLE\_MsgA}$ for the terminal device.

For example, the terminal device may receive a reference path loss compensation factor and a reference power offset that are sent by the access network device. When determining that the first time-frequency resource is not the random access channel time-frequency resource shared by the two-step random access procedure and the four-step random access procedure, the terminal device may determine that the first path loss compensation factor is the reference path compensation factor, and determine that $\Delta P_{REAMBLE\_MsgA}$ is the reference power offset. Similar to the configuration of the power control parameters of the random access channel in the two-step random access procedure, the configuration of the offset values can reduce signaling overheads.

The foregoing technical solution can reduce signaling overheads of the two-step random access procedure and interference to a user in the four-step random access procedure, and can implement flexible configuration.

In some possible implementations, the method for determining the power control parameter of the random access channel used in the two-step random access procedure and the method for determining the first power control parameter may be applied to the method shown in the embodiments of this application.

In some other possible implementations, the method for determining the power control parameter of the random access channel used in the two-step random access procedure and the method for determining the first power control parameter may also be applied to the existing two-step random access procedure. In other words, all other steps in the two-step random access procedure except the step of determining the power control parameter of the random access channel used in the two-step random access procedure and the step of determining the first power control parameter may be the same as those in the current technology.

Optionally, in some embodiments, if the access network device has successfully obtained the random access preamble, the retransmitted random access message may not need to include the random access preamble. In this case, it may be considered that retransmission of the PUSCH information is synchronous transmission. Therefore, in this case, a power offset parameter correction value does not need to be introduced into the retransmitted random access message. In other words, if the random access message is the first-type retransmitted random access message (that is, a retransmitted random access message that does not include a random access preamble), the terminal device may also determine the target power according to the formula 1.7, and $\Delta_{Asyn}$ in the formula 1.7 is set to 0. In other words, if the random access message is the first-type retransmitted random access message (that is, a retransmitted random access message that does not include a random access preamble), the terminal device may also determine the target power according to the formula 1.8, and & in the formula 1.8 is set to 1. In other words, if the random access message is the first-type retransmitted random access message, the terminal device may directly set a corresponding power offset parameter correction value to 0 or 1 without obtaining the power offset parameter correction value from the access network device.

The second candidate uplink transmit power may be a preset threshold. Optionally, in some embodiments, the preset threshold (that is, the second candidate uplink transmit power) may be the maximum transmit power configured by the access network device for the terminal device. More specifically, the second candidate uplink transmit power may be $P_{CMAX,f,c}$ (i), that is, the maximum transmit power configured for the terminal device in the transmission time element i. In other words, the terminal device may determine the PUSCH transmit power according to the following formula:

$$P_1(i, j) = \min\{P_{CMAX,f,c}(i), P_{Can,b,f,c}(i, j)\} \quad \text{(Formula 1.19)}$$

where $P_1$ represents the PUSCH transmit power, and $P_1$(i, j) represents a PUSCH transmit power corresponding to a sequence number i of a transmission time unit and a configuration index j.

Optionally, in some embodiments, the terminal device may alternatively send the random access preamble and the PUSCH information in the random access message in a frequency division multiplexing manner. In other words, the terminal device may send the random access preamble and the PUSCH information by using an unused frequency domain resource. The second candidate uplink transmit power may be a difference between a preset threshold and the random access preamble transmit power. The preset threshold may be the maximum transmit power configured by the access network device for the terminal device. The terminal device sends the random access preamble based on the random access preamble transmit power. Optionally, the random access preamble transmit power may also be referred to as random access channel transmit power. Optionally, a time domain resource used to send the random access preamble may be the same as a time domain resource used to send the PUSCH information.

Optionally, in some embodiments, the terminal device sends the random access preamble and the PUSCH information in a frequency division multiplexing manner. In this case, if the PUSCH transmit power determined by the terminal device is greater than a preset maximum PUSCH transmit power, the terminal device may send only the random access preamble.

A manner of determining a transmit power used to send the random access preamble is not limited in the embodiments of this application. For example, a determining manner in the current technology may be used. For example, if the random access message is an initially transmitted random access message, the random access preamble transmit power may be determined by using the following formula:

$$P_{PRACH,b,f,c}(i) = \min\{P_{CMAX,f,c}(i), P_{PRACH,target,f,c} + PL_{b,f,c}\} \quad \text{(Formula 1.20)}$$

where $P_{PRACH,b,f,c}$(i) represents the random access preamble transmit power, $P_{PRACH,target,f,c}$ represents the initial target power of the random access preamble, $PL_{b,f,c}$ represents the estimated path loss, and $P_{CMAX,f,c}$ (i) represents the maximum transmit power configured for the terminal device in the transmission time element i.

For another example, if the random access message is the second-type retransmitted random access message, the random access preamble transmit power may be determined according to the following formula:

$$P_{PRACH,b,f,c}(i) = \min\{P_{CMAX,f,c}(i), P_{PRACH,target,f,c} + PL_{b,f,c}\} \quad \text{(Formula 1.21)}$$

where $P_{PRACH,b,f,c}$(i) represents the random access preamble transmit power, $P_{PRACH,target,f,c}$ represents a sum of the initial target power of the random access preamble and a power ramp value, $PL_{b,f,c}$ represents the estimated path loss, and $P_{CMAX,f,c}$ (i) represents the maximum transmit power configured for the terminal device in the transmission time element i. The power ramp value may be equal to a power ramp step multiplied by the quantity of retransmission times.

Optionally, in some embodiments, sending the PUSCH information in the random access message based on the PUSCH transmit power may include: directly sending, by the terminal device, the PUSCH information at the PUSCH transmit power.

Optionally, in some other embodiments, sending the PUSCH information in the random access message based on the PUSCH transmit power may include: determining, by the terminal device based on the PUSCH transmit power and the random access preamble transmit power, the transmit power used to send the PUSCH information.

Specifically, the random access preamble may be used for channel estimation. To ensure performance of channel estimation, the power used to send the PUSCH information and the power used to send the random access preamble need to meet a preset relationship. For example, the power used to send the PUSCH information is the same as the power used to send the random access preamble. For another example, the transmit power actually used to send the PUSCH and the transmit power actually used to send the random access preamble may be determined based on a larger value in the determined power used to send the PUSCH information and the determined power used to send the random access preamble.

For another example, the power used to send the PUSCH information and the power used to send the random access preamble meet a predetermined proportional relationship. Because the bandwidth used to send the PUSCH information is different from the bandwidth used to send the random access preamble, the proportional relationship may be related to the bandwidth of the PUSCH information and the bandwidth of the random access preamble. For example, the bandwidth used to send the PUSCH information is $W_1$, the bandwidth used to send the random access preamble is $W_2$, and the corresponding proportional relationship may be set to $W_1/W_2$. The transmit power used to send the PUSCH information and the transmit power used to send the random access preamble need to meet both the predetermined proportional relationship and a constraint of the maximum transmit power. For example, the transmit power used to send the random access preamble is determined as $P_1$ according to the formula 1.20 or the formula 1.21, the transmit power used to send the PUSCH information is determined as $P_2$ according to the formula 1.2, and the maximum transmit power supported by the terminal device is $P_{max}$. To make the transmit power $P_3$ actually used to send the random access preamble and the transmit power $P_4$ actually used to send the PUSCH information meet a preset relationship: $P_3=P_4+\Delta P$, where $\Delta P$ is a preset power difference, $P_3$ and $P_4$ may be set by using the following steps, so that $P_3$ and $P_4$ not only meet a power requirement in the two-step random access procedure, but also meet a predetermined proportional relationship.

When $P_2$ is less than or equal to $P_1+\Delta P$ and $P_1+\Delta P$ is less than or equal to Pmax, $P_3=P_1$, and $P_4=P_1+\Delta P$.

When $P_2$ is less than or equal to $P_1+\Delta P$, and $P_1+\Delta P$ is greater than Pmax, $P_3=P_{max}-\Delta P$, and $P_4=P_{max}$.

When $P_2$ is greater than $P_1+\Delta P$ and $P_2-\Delta P$ is less than or equal to Pmax, $P_3=P_2-\Delta P$, and $P_4=P_2$.

When $P_2$ is greater than $P_1+\Delta P$ and $P_2-\Delta P$ is greater than Pmax, $P_3=P_{max}$, and $P_4=P_{max}+\Delta P$.

In other words, in some embodiments, the random access preamble transmit power may not be the transmit power actually used by the terminal device to send the random access preamble, and similarly, the PUSCH transmit power may not be the transmit power actually used by the terminal device to send the PUSCH information. The terminal device may determine the actually used transmit power based on a relationship between the random access preamble transmit power and the PUSCH transmit power.

Optionally, in some embodiments, the terminal device may determine a first frequency domain resource and a second frequency domain resource, where the first frequency domain resource is a frequency domain resource used to send a random access preamble in a random access message, and the second frequency domain resource is a frequency domain resource used to send PUSCH information in the random access message. When determining that the first frequency domain resource is the same as the second frequency domain resource or the first frequency domain resource includes the second frequency domain resource, the terminal device determines at least one of the random access preamble transmit power and the transmit power of the PUSCH information based on a transmit power offset value.

For example, a frequency domain range of the first frequency domain resource is $F_1$ to $F_2$, where $F_1$ is less than $F_2$; and a frequency domain range of the second frequency domain resource is $F_3$ to $F_4$, where $F_3$ is less than $F_4$. If $F_1$ is equal to $F_3$ and $F_2$ is equal to $F_4$, or $F_1$ is less than $F_3$ and $F_2$ is greater than $F_4$, the terminal device may determine at least one of the random access preamble transmit power and the transmit power of the PUSCH information based on the transmit power offset value.

Optionally, in some embodiments, the transmit power offset value is configured by the access network device. Therefore, before the random access preamble transmit power and the transmit power of the PUSCH information are determined based on the transmit power offset value, the method further includes: receiving the transmit power offset value sent by the access network device.

Optionally, in some other embodiments, the transmit power offset value may be determined by the terminal device. For example, in some embodiments, the terminal device may determine the transmit power offset value according to the following formula:

$$\Delta_2 = 10\log_{10}(W_1/W_2) \qquad \text{Formula 4.1}$$

where $\Delta_2$ represents the transmit power offset value, $W_1$ represents the bandwidth used to send the PUSCH information, and $W_2$ represents the bandwidth used to send the random access preamble.

Optionally, in some other embodiments, the terminal device may determine the transmit power offset value according to the following formula:

$$\Delta_2 = 10\log_{10}(W_1/W_2) + \Delta_3 \qquad \text{Formula 4.2}$$

where $\Delta_2$ represents the transmit power offset value, $W_1$ represents the bandwidth used to send the PUSCH information, $W_2$ represents the bandwidth used to send the random access preamble, and $\Delta_3$ represents a power offset adjustment parameter. The power offset adjustment parameter is sent by the access network device to the terminal device. In other words, before determining the transmit power offset value, the terminal device needs to receive the power offset adjustment parameter sent by the access network device.

Optionally, in some embodiments, that the terminal device determines the random access preamble transmit power and the transmit power of the PUSCH information based on the transmit power offset value includes: The terminal device determines the random access preamble transmit power. A manner in which the terminal device determines the random access preamble transmit power is the same as that in the current technology. Details are not described herein. After determining the random access preamble transmit power, the terminal device may determine the transmit power of the PUSCH information based on the following formula:

$$P_{PUSCH} = P_{PRACH} + \Delta_2 \quad \text{Formula 4.3}$$

where $P_{PUSCH}$ represents the transmit power of the PUSCH information, $P_{PRACH}$ represents the random access preamble transmit power, and $\Delta_2$ represents the transmit power offset value.

Optionally, in some embodiments, that the terminal device determines the random access preamble transmit power and the transmit power of the PUSCH information based on the transmit power offset value includes: The terminal device may determine the random access preamble transmit power according to the current technology, and determine the transmit power of the PUSCH information according to the current technology. For ease of description, the transmit power that is of the random access preamble and that is determined by the terminal device according to the current technology is referred to as a first random access preamble reference transmit power, and the transmit power that is of the PUSCH information and that is determined by the terminal device according to the current technology is referred to as a first PUSCH information reference transmit power. After determining the first random access preamble reference transmit power and the first PUSCH information reference transmit power, the terminal device may determine the random access preamble transmit power and the transmit power of the PUSCH information based on the first random access preamble reference transmit power, the first PUSCH information reference transmit power, and the transmit power offset value. Specifically, if a difference between the first PUSCH information reference transmit power and the first random access preamble reference transmit power is less than the transmit power offset value, it is determined that the random access preamble transmit power is equal to the first random access preamble reference transmit power, and that the transmit power of the PUSCH information is equal to a sum of the first PUSCH information reference transmit power and the transmit power offset value. If a difference between the first PUSCH information reference transmit power and the first random access preamble reference transmit power is greater than or equal to the transmit power offset value, it is determined that the random access preamble transmit power is equal to a difference between the first PUSCH information reference transmit power and the transmit power offset value, and that the transmit power of the PUSCH information is equal to the first PUSCH information reference transmit power.

Optionally, in some other possible implementations, that the terminal device determines the random access preamble transmit power and the transmit power of the PUSCH information based on the transmit power offset value includes: if the transmit power offset value is greater than 0 and the first PUSCH information reference transmit power is greater than or equal to the maximum transmit power, determining that the transmit power of the PUSCH information is the maximum transmit power, and that the random access preamble transmit power is a difference between the maximum transmit power and the transmit power offset value; and if the difference between the transmit power offset value is less than 0 and the first random access preamble reference transmit power is greater than or equal to the maximum transmit power, determining that the random access preamble transmit power is the maximum transmit power, and that the transmit power of the PUSCH information is a difference between the maximum transmit power and the transmit power offset value.

Optionally, in some other embodiments, when determining that the first frequency domain resource is the same as the second frequency domain resource or that the first frequency domain resource includes the second frequency domain resource, the terminal device determines, based on an offset value of energy of each resource element, energy of each resource element used to send the random access preamble and energy of each resource element used to send the PUSCH information.

Energy of each resource element (energy per resource element, EPRE) is equal to a transmit power divided by a quantity of resource elements. The quantity of resource elements may be a quantity of resource elements used to transmit a signal in a transmission bandwidth. Therefore, if any two of the EPRE, the transmit power, and the quantity of resource elements are determined, the remaining parameter may be determined based on the determined two parameters.

The terminal device may receive the offset value that is of the energy of each resource element and that is configured by the access network device.

A specific implementation of determining, by the terminal device based on the offset value of the energy of each resource element, energy of each resource element used to send the random access preamble and energy of each resource element used to send the PUSCH information is similar to a specific implementation of determining, by the terminal device, the random access preamble transmit power and the transmit power of the PUSCH information based on the transmit power offset value.

The offset value of the energy of each resource element, the energy of each resource element used to send the random access preamble, and the energy of each resource element used to send the PUSCH information may meet the following relationship:

$$\Delta_2' = EPRE_{PUSCH} - EPRE_{PRACH} \quad \text{Formula 4.4}$$

where $EPRE_{PUSCH}$ represents the energy of each resource element used to send the PUSCH information, $EPRE_{PRACH}$ represents the energy of each resource element used to send the random access preamble, and $\Delta_2'$ represents the offset value of the energy of each resource element.

For example, in some embodiments, the terminal device may first determine the energy of each resource element used to send the random access preamble. A manner in which the terminal device determines the energy of each resource element used to send the random access preamble is the same as that in the current technology. Details are not described herein. After determining the energy of each resource element used to send the random access preamble, the terminal device may determine, according to the following formula, the energy of each resource element used to send the PUSCH information:

$$EPRE_{PUSCH} = EPRE_{PRACH} + \Delta_2' \quad \text{Formula 4.5}$$

where $EPRE_{PUSCH}$ represents the energy of each resource element used to send the PUSCH information, $EPRE_{PRACH}$ represents the energy of each resource element used to send the random access preamble, and $\Delta_2'$ represents the offset value of the energy of each resource element.

Optionally, in some embodiments, that the terminal device determines, based on the offset value of the energy of each resource element, the energy of each resource element used to send the random access preamble and the energy of each resource element used to send the PUSCH information includes: The terminal device may determine, according to the current technology, the energy of each resource element used to send the random access preamble, and determine, according to the current technology, the energy of each resource element used to send the PUSCH information. For ease of description, the energy that is of each resource element used to send the random access preamble and that is determined by the terminal device according to the current technology is referred to as first random access preamble reference energy, and the energy that is of each resource element used to send the PUSCH information and that is determined by the terminal device according to the current technology is referred to as first PUSCH information reference energy. After determining the first random access preamble reference energy and the first PUSCH information reference energy, the terminal device may determine, based on the first random access preamble reference energy, the first PUSCH information reference energy, and the offset value of the energy of each resource element, the energy of each resource element used to send the random access preamble and the energy of each resource element used to send the PUSCH information. Specifically, if a difference between the first PUSCH information reference energy and the first random access preamble reference energy is less than the offset value of the energy of each resource element, it is determined that the energy of each resource element used to send the random access preamble is equal to the first random access preamble reference energy, and that the energy of each resource element used to send the PUSCH information is equal to a sum of the first PUSCH information reference energy and the offset value of the energy of each resource element. If the difference between the first PUSCH information reference energy and the first random access preamble reference energy is greater than or equal to the offset value of the energy of each resource element, it is determined that the energy of each resource element used to send the random access preamble is equal to a difference between the first PUSCH information reference energy and the offset value of the energy of each resource element, and that the energy of each resource element of the PUSCH information is equal to the first PUSCH information reference energy.

Optionally, in some other possible implementations, that the terminal device determines, based on the offset value of the energy of each resource element, the energy of each resource element used to send the random access preamble and the energy of each resource element used to send the PUSCH information includes: If the offset value of the energy of each resource element is greater than 0 and the first PUSCH information reference energy is greater than or equal to maximum energy of each resource element, it is determined that the energy of each resource element used to send the PUSCH information is the maximum energy of each resource element, and that the energy of each resource element used to send the random access preamble is a difference between the maximum energy of each resource element and the offset value of the energy of each resource element. If the difference between the offset value of the energy of each resource element is less than 0 and the first random access preamble reference energy is greater than or equal to the maximum energy of each resource element, it is determined that the energy of each resource element used to send the random access preamble is the maximum energy of each resource element, and that the energy of each resource element used to send the PUSCH information is a difference between maximum energy of each resource element and the offset value of the energy of each resource element.

In some possible implementations, the methods for determining the random access preamble transmit power and determining the transmit power of the PUSCH information (or determining the energy of each resource element used to send the random access preamble and determining the energy of each resource element used to send the PUSCH information) may be applied to the method shown in the embodiments of this application.

In some other possible implementations, the methods for determining the random access preamble transmit power and determining the transmit power of the PUSCH information (or determining the energy of each resource element used to send the random access preamble and determining the energy of each resource element used to send the PUSCH information) may alternatively be applied to the existing two-step random access procedure. In other words, all other steps in the two-step random access procedure except the step of determining the random access preamble transmit power and the step of determining the transmit power of the PUSCH information (or determining the energy of each resource element used to send the random access preamble and determining the energy of each resource element used to send the PUSCH information) may be the same as those in the current technology.

The offset relationship between the random access preamble transmit power and the transmit power of the PUSCH information is determined depending on whether the random access preamble and the PUSCH information in the random access message are in a same time-frequency resource position. This helps an access network device perform channel estimation based on the random access preamble. In some embodiments, a random access preamble function may be implemented by using a demodulation reference signal (DMRS) in the PUSCH information. In other words, the random access message sent by the terminal device to the access network device may include only the PUSCH information. For ease of distinguishing between the DMRS and other data in the PUSCH information, the following uses first PUSCH information to represent the DMRS, and uses second PUSCH information to represent the other data in the PUSCH information except the DMRS. In addition, unless otherwise specified, in the embodiments of this application, a specific random access message is used to represent a random access message that uses a DMRS to implement a random access preamble function. Unless otherwise specified, the random access message in the embodiments of this application is a random access message that uses a random access preamble to implement a random access preamble function in the foregoing embodiments.

The specific random access message sent by the terminal device to the access network device for the first time may be referred to as an initially transmitted specific random access message.

Similar to the random access message, in some cases, the terminal device can complete a random access procedure by sending the specific random access message to the access network device only once.

In some other cases, the access network device may not obtain the specific random access message sent by the terminal device. For example, the access network device may not receive the specific random access message sent by the terminal device, or may not correctly parse the specific random access message sent by the terminal device. In this case, the terminal device needs to send the specific random access message to the access network device again until the access network device successfully obtains the specific random access message sent by the terminal device. For ease of description, the specific random access message re-sent by the terminal device to the access network device is referred to as a retransmitted specific random access message below.

Similarly, the retransmission of the specific random access message may also include three cases. Case 1: Only the second PUSCH information needs to be retransmitted. In other words, the access network device has successfully obtained the first PUSCH information, but has not successfully obtained the second PUSCH information. In this case, the retransmitted specific random access message may include only the second PUSCH information. Case 2: The first PUSCH information and the second PUSCH information need to be retransmitted. In other words, neither the first PUSCH information nor the second PUSCH information sent by the terminal device is successfully obtained by the access network device. In this case, the retransmitted specific random access message may include the first PUSCH information and the second PUSCH information. Case 3: The first PUSCH information needs to be retransmitted. In other words, the access network device has successfully obtained the second PUSCH information, but has not successfully obtained the first PUSCH information. In this case, the retransmitted specific random access message may include only the first PUSCH information.

Optionally, in some embodiments, a manner of determining a transmit power of the initially transmitted specific random access message may be similar to the manner of determining the PUSCH transmit power in the foregoing embodiment.

Specifically, the terminal device may receive a broadcast message that is sent by the access network device and that carries first power control information, where the first power control information is used to determine an MCS compensation factor. The terminal device may determine the MCS compensation factor based on the first power control information. The terminal device may determine a first candidate uplink transmit power based on the MCS compensation factor. The terminal device may determine a smaller value in the first candidate uplink transmit power and a maximum transmit power of the terminal device as the transmit power used to send the initially transmitted specific random access message.

For specific content of the first power control information and a specific implementation in which the terminal device determines the MCS compensation factor based on the first power control information, refer to the foregoing embodiment. Details are not described herein again.

That the terminal device determines the first candidate uplink transmit power based on the MCS compensation factor may include: The terminal device determines the first candidate uplink transmit power according to the formula 1.1. When the first candidate uplink transmit power is determined, the terminal device may determine, according to formula 1.19, the transmit power used to send the initially transmitted specific random access message.

In addition, for a manner of determining an intermediate parameter that needs to be used in the process of determining the first candidate uplink transmit power by the terminal device according to the formula 1.1, refer to the foregoing embodiment.

For example, for a manner of determining a target power by the terminal device, refer to the formula 1.17. In other words, the target power is determined by using the following formula:

$$P_{O_{PUSCH},b,f,c}(j) = P_{O\_PRE} + \Delta_{DMRS\_MsgA} + \Delta_{Asyn} \quad \text{(Formula 2.1)}$$

where $P_{O_{PUSCH},b,f,c}(j)$ represents the target power, $P_{O\_PRE}$ represents an initial target power of the DMRS in the random access message, $\Delta_{DMRS\_MsgA}$ represents a power offset between the specific random access message and the first PUSCH information, and Asyn represents a power offset parameter correction value, and is greater than or equal to 0. Meanings of j, f, and c are the same as meanings of those in the formula 1.1 and the formula 1.2. Details are not described herein again. It can be learned that a difference between the formula 2.1 and the formula 1.17 lies only in that $\Delta P_{REAMBLE\_MsgA}$ in the formula 1.17 is replaced with $\Delta_{DMRS\_MsgA}$. For a manner of determining $\Delta_{Asyn}$, refer to the foregoing embodiment. Details are not described herein again.

For another example, for a manner of determining a target power by the terminal device, refer to the formula 1.8. In other words, the target power is determined by using the following formula:

$$P_{O_{PUSCH},b,f,c}(j) = P_{O\_PRE} + \varepsilon \cdot \Delta_{DMRS\_MsgA} \quad \text{(Formula 2.2)}$$

where $P_{O_{PUSCH},b,f,c}(j)$ represents the target power, $P_{O\_PRE}$ represents an initial target power of the DMRS in the random access message, and $\varepsilon \cdot \Delta_{DMRS\_MsgA}$ represents a power offset that is between the second PUSCH information and the DMRS in the random access message and that is added after asynchronous transmission is considered. More specifically, $\Delta_{DMRS\_MsgA}$ represents a power offset between the second PUSCH information and the first PUSCH information, ε represents the power offset parameter correction value, and a value of & is greater than or equal to 1. Meanings of j, f, and c are the same as meanings of those in the formula 1.1 and the formula 1.2. Details are not described herein again. It can be learned that a difference between the formula 2.2 and the formula 1.18 lies only in that $\Delta P_{REAMBLE\_MsgA}$ in the formula 1.18 is replaced with $\Delta_{DMRS\_MsgA}$.

Optionally, in some embodiments, the terminal device may alternatively determine, according to the following formula, a transmit power used to initially transmit the first PUSCH information:

$$P_{DMRS,b,f,c}(i)=\min\{P_{CMAX,f,c}(i),\, P_{DMRS,target,f,c}+PL_{b,f,c}\} \quad \text{(Formula 2.3)}$$

where $P_{DMRS,b,f,c}(i)$ represents the transmit power used to initially transmit the first PUSCH information, $P_{DMRS,target,f,c}$ represents an initial target power of the DMRS, $PL_{b,f,c}$ represents an estimated path loss, and $P_{CMAX,f,c}(i)$ represents a maximum transmit power configured for the terminal device in a transmission time element i.

If the random access message sent by the terminal device is a retransmitted random access message in the foregoing case 2 (that is, the random access message includes the first PUSCH data and the second PUSCH information), a transmit power used to send the first PUSCH information in the retransmitted random access message may be determined according to the following formula:

$$P_{DMRS,b,f,c}(i)=\min\{P_{CMAX,f,c}(i),\, P_{DMRS,target,f,c}+PL_{b,f,c}\} \quad \text{(Formula 2.4)}$$

where $P_{DMRS,b,f,c}(i)$ represents a transmit power used to send the first PUSCH information in the retransmitted random access message, $P_{DMRS,target,f,c}$ represents a sum of an initial target power of the DMRS and a power ramp value, $PL_{b,f,c}$ represents an estimated path loss, and $P_{CMAX,f,c}(i)$ represents a maximum transmit power configured for the terminal device in a transmission time unit i. The power ramp value $\Delta_{power\_ramp1}$ may be equal to a power ramp step multiplied by a quantity of retransmission times.

Optionally, in some embodiments, if the random access message sent by the terminal device is a retransmitted random access message and is a random access message retransmitted in the foregoing case 2 (that is, the random access message includes the first PUSCH information and the second PUSCH information), a transmit power used for retransmitting the random access message may be determined according to the formula 1.1.

Optionally, in some other embodiments, if the random access message sent by the terminal device is a retransmitted random access message and is a random access message retransmitted in the foregoing case 2 (that is, the random access message includes the first PUSCH information and the second PUSCH information), a transmit power used for retransmitting the random access message may be determined according to the formula 1.2.

Optionally, in some embodiments, if the random access message sent by the terminal device is a retransmitted random access message and is a random access message retransmitted in the foregoing case 2 (that is, the random access message includes the first PUSCH information and the second PUSCH information), a target power that needs to be used in the process of determining, by the terminal device according to the formula 1.1 or the formula 1.2, the transmit power used to retransmit the random access message may be determined according to the following formula:

$$P_{O_{PUSCH},b,f,c}(j)=P_{O\_PRE}+\Delta_{DMRS\_MsgA}+\Delta_{Asyn}+\Delta_{power\_ramp2} \quad \text{(Formula 2.5)}$$

where $P_{O_{PUSCH},b,f,c}(j)$ represents the target power, $P_{O\_PRE}$ represents an initial target power of the DMRS in the random access message, $\Delta_{DMRS\_MsgA}$ represents a power offset between the second PUSCH information and the first PUSCH information, and $\Delta_{Asyn}$ represents a power offset parameter correction value and is greater than or equal to 0, and $\Delta_{power\_ramp2}$ represents a retransmission power ramp value. The retransmission power ramp value may be a quantity of retransmission times multiplied by a power ramp step. Meanings of j, f, and c are the same as meanings of those in the formula 1.1 and the formula 1.2. Details are not described herein again.

Optionally, in some embodiments, if the random access message sent by the terminal device is a retransmitted random access message and is a random access message retransmitted in the foregoing case 2 (that is, the random access message includes the first PUSCH information and the second PUSCH information), a target power that needs to be used in the process of determining, by the terminal device according to the formula 1.1 or the formula 1.2, the transmit power used to retransmit the random access message may alternatively be determined according to the following formula:

$$P_{O_{PUSCH},b,f,c}(j)=P_{O\_PRE}+\varepsilon\cdot\Delta_{DMRS\_MsgA}+\Delta_{power\_ramp2} \quad \text{(Formula 2.6)}$$

where $P_{O_{PUSCH},b,f,c}(j)$ represents the target power, $P_{O\_PRE}$ represents an initial target power of the DMRS in the random access message, and $\varepsilon\cdot\Delta_{DMRS\_MsgA}$ represents a power offset that is between the random access message and the DMRS in the random access message and that is added after asynchronous transmission is considered. More specifically, $\Delta_{DMRS\_MsgA}$ represents a power offset between the second PUSCH information and the first PUSCH information, ε represents the power offset parameter correction value, and a value of & is greater than or equal to 1. $\Delta_{power\_ramp2}$ represents a retransmission power ramp value. The retransmission power ramp value may be a quantity of retransmission times multiplied by a power ramp step. Meanings of j, f, and c are the same as meanings of those in the formula 1.1 and the formula 1.2. Details are not described herein again.

For manners of determining $\Delta_{Asyn}$ in the formula 2.1 and the formula 2.5, and manners of determining & in the formula 2.2 and the formula 2.6, refer to the foregoing embodiment. Details are not described herein again.

Optionally, in some embodiments, if the random access message sent by the terminal device is a retransmitted random access message and is a random access message retransmitted in the foregoing case 1 (that is, the random access message includes only the second PUSCH information), a transmit power used for retransmitting the random access message may be determined according to the formula 1.1.

Optionally, in some other embodiments, if the random access message sent by the terminal device is a retransmitted random access message and is a random access message retransmitted in the foregoing case 1 (that is, the random access message includes only the second PUSCH information), a transmit power used for retransmitting the random access message may be determined according to the formula 1.2.

Optionally, in some embodiments, if the random access message sent by the terminal device is a retransmitted random access message and is a random access message retransmitted in the foregoing case 1 (that is, the random access message includes only the second PUSCH information), a target power that needs to be used in the process of determining, by the terminal device according to the formula 1.1 or the formula 1.2, the transmit power used to retransmit the random access message may be determined according to the formula 2.5, and a value of $\Delta_{Asyn}$ is 0 when the target power is determined according to the formula 2.5.

Optionally, in some embodiments, if the random access message sent by the terminal device is a retransmitted random access message and is a random access message retransmitted in the foregoing case 1 (that is, the random access message includes only the second PUSCH information), a target power that needs to be used in the process of determining, by the terminal device according to the formula 1.1 or the formula 1.2, the transmit power used to retransmit the random access message may be determined according to the formula 2.6, and a value of ε is 1 when the target power is determined according to the formula 2.6.

Optionally, in some embodiments, a power ramp step used for calculating $\Delta_{power\_ramp2}$ may be the same as a power ramp step used for calculating $\Delta_{power\_ramp1}$.

Optionally, in some other embodiments, a power ramp step used for calculating $\Delta_{power\_ramp2}$ may be different from a power ramp step used for calculating $\Delta_{power\_ramp1}$.

Optionally, in some embodiments, if the terminal device determines, according to the formula 1.2, the transmit power used to retransmit the random access message, a power control adjustment amount may be equal to 0. In this case, it means that the terminal device determines, according to the formula 1.1, the transmit power used to retransmit the random access message.

Optionally, in some other embodiments, if the terminal device determines, according to the formula 1.2, the transmit power used to retransmit the random access message, a power ramp amount may be equal to $\Delta_{power\_ramp2}$.

Optionally, when the transmit power used for the random access message is determined according to the formula 1.1 or the formula 1.2, the power control adjustment amount may also be determined by referring to any one of the formula 1.3, the formula 1.5, the formula 1.6, the formula 1.8, the formula 1.11, or the formula 1.14. When the power control adjustment amount is determined according to the foregoing formula, related information of the random access preamble in the foregoing formula needs to be replaced with related information of the DMRS. The formula 1.6 is used as an example. When the power control adjustment amount is determined according to the formula 1.6, the total random access preamble ramp power may be replaced with a total DMRS ramp power. In other words, when the power control adjustment amount is determined according to the formula 1.6, the initial power control adjustment amount in the formula 1.6 may be a smaller value in the headroom of the power that can be ramped for the PUSCH and the total DMRS ramp power.

In a carrier aggregation (CA), supplementary uplink (SUL), or dual connectivity (DC) scenario, a terminal device may simultaneously send a plurality of a PRACH, a PUSCH, a physical uplink control channel (PUCCH), and a sounding reference signal (SRS) on different carriers or in different cells. In this application, the PRACH, the PUSCH, the PUCCH, and the SRS are different types of uplink signals. Generally, the terminal device separately performs power control on different uplink signals, that is, the terminal device independently calculates transmit powers of the uplink signals. Therefore, there may be a case in which a sum of transmit powers of a plurality of uplink signals needs to be greater than the maximum transmit power of the terminal device. In this case, how to control the transmit power of each uplink signal becomes a problem that needs to be resolved.

For the foregoing problem, this application provides a method for determining a transmit power of an uplink signal, and the method includes the following steps.

Step S1: Determine a total transmit power of a plurality of uplink signals, where time domain resources of the plurality of uplink signals are at least partially the same.

Step S2: When the total transmit power of the plurality of uplink signals exceeds a maximum transmit power of a terminal device, determine respective transmit powers of the plurality of uplink signals based on a preset power priority sequence.

In this embodiment, the uplink signal may be a PRACH, a PUSCH, a PUCCH, or an SRS. According to different types of random access procedures, PRACHs are classified into two types: a Msg1 PRACH and a MsgA PRACH. The Msg1 PRACH is a PRACH in a four-step random access procedure, and the MsgA PUSCH is a PRACH in a MsgA message in a two-step random access procedure. According to different resource configuration manners, PUSCHs may be classified into a dynamic scheduled PUSCH, a semi-persistent scheduling (semi-static scheduled) PUSCH, and a preconfigured uplink resource (PUR) PUSCH. The dynamic scheduled PUSCH is a PUSCH scheduled by using DCI. The semi-static scheduled PUSCH may also be referred to as a grant-free PUSCH or a PUSCH transmission with configured grant (PUSCH transmission with configured grant). The PUR PUSCH is a PUSCH generated based on a preconfigured time-frequency resource and/or another transmission parameter. In another embodiment, the semi-static scheduled PUSCH or the MsgA PUSCH may also be considered as one type of PUR PUSCH, where the MsgA PUSCH is a PUSCH in the MsgA.

In this embodiment, the time domain resources of the plurality of uplink signals in step S1 may be completely the same. For example, a time domain resource of a first uplink signal is symbols whose indexes are 4 to 8 in a slot 0, a time domain resource of a second uplink signal is the symbols whose indexes are 4 to 8 in the slot 0, and a time domain resource of a third uplink signal is the symbols whose indexes are 4 to 8 in the slot 0. The time domain resources of the plurality of uplink signals in step S1 may be partially the same. For example, a time domain resource of a first uplink signal is symbols whose indexes are 4 to 8 in a slot 0, a time domain resource of a second uplink signal is symbols whose indexes are 6 to 9 in the slot 0, and a time domain resource of a third uplink signal is symbols whose indexes are 5 to 10 in the slot 0.

In step S1, the terminal device may determine the transmit power of each uplink signal based on a power determining method corresponding to each uplink signal. For example, if the uplink signal is a PRACH, the terminal device determines a transmit power of the PRACH based on a PRACH power determining method. If the uplink signal is a PUSCH, the terminal device determines a transmit power of the PUSCH based on a PUSCH power determining method. For a method for determining a power corresponding to each uplink signal, refer to related descriptions in the 3GPP TS38.213 standard. For methods for determining powers of the MsgA PRACH and the MsgA PUSCH, refer to related descriptions in other embodiments of this application. In this application, the transmit power of each uplink signal determined in step S1 is referred to as an initial transmit power of each uplink signal, and the transmit power of each uplink signal determined in step S2 is referred to as a final transmit power. It may be understood that when a sum of the initial transmit powers of all the uplink signals exceeds the maximum transmit power of the terminal device, initial transmit powers of some uplink signals may not need to be adjusted, and initial transmit powers of some uplink signals may need to be adjusted.

In this embodiment of this application, the power priority sequence specifies a transmit power allocation sequence of different types of uplink signals. When the sum of the initial transmit powers of the uplink signals exceeds the maximum transmit power of the terminal device, initial powers of one or more uplink signals may be reduced based on the power priority sequence, so that a sum of the final transmit powers of the uplink signals is less than or equal to the maximum transmit power of the terminal device. In an implementation, an initial transmit power of an uplink signal with a lowest priority is preferably adjusted (reduced). When the transmit power of the uplink signal with the lowest power priority is adjusted to 0, if a sum of transmit powers of other uplink signals is still greater than the maximum transmit power of the terminal device, a transmit power of an uplink signal with a second lowest power priority is adjusted, and by analog, until a sum of adjusted transmit powers of all the transmit signal is less than or equal to the maximum transmit power of the terminal device. In another implementation, a transmit power of each uplink signal may be reduced based on the power priority sequence, where a power reduction amplitude (or a proportion of a power reduction amplitude) of a transmit power of an uplink signal with a highest power priority is the smallest, and a power reduction amplitude (or a proportion of a power reduction amplitude) of a transmit power of an uplink signal with a lowest power priority is the largest. How the terminal device reduces a transmit power of an uplink signal is not limited in this application.

In an embodiment, this application provides power priorities of different uplink signals and a sequence of the power priorities, as shown in Table 1.

TABLE 1

| | |
|---|---|
| First power priority | Msg1 PRACH in a primary cell, MsgA PRACH in the primary cell, MsgA PUSCH in the primary cell, or PUR PUSCH in the primary cell |
| Second power priority | PUCCH including a HARQ-ACK and/or an SR, or PUSCH including a HARQ-ACK |
| Third power priority | PUCCH including CSI, or PUSCH including CSI |
| Fourth power priority | PUSCH excluding a HARQ-ACK or CSI |
| Fifth power priority | SRS (where an aperiodic SRS has a higher priority than a periodic SRS or semi-persistent SRS), Msg1 PRACH in a non-primary cell, PRACH in the non-primary cell, MsgA PUSCH in the non-primary cell, or PUR PUSCH in the non-primary cell |

In the foregoing table, the first power priority, the second power priority, the third power priority, the fourth power priority, and the fifth power priority are in descending order. The terminal device may determine, based on a type of each uplink signal, a priority corresponding to each uplink signal.

When power adjustment is performed according to the priority sequence in Table 1, when the plurality of uplink signals include the MsgA PRACH or the MsgA PUSCH, a MsgA access delay may be ensured, thereby reducing a random access delay. When a TA of the terminal device is valid, during random access, the terminal device may send only a PUSCH, and does not need to send a PRACH. In this case, the PUSCH may be referred to as a PUR PUSCH, a PUSCH on PUR (PUSCH on Preconfigured Uplink Resource), or a MsgA PUSCH, that is, may be considered as a special case of the two-step random access procedure.

In another embodiment, this application provides power priorities of different uplink signals and a sequence of the power priorities, as shown in Table 2.

TABLE 2

| | |
|---|---|
| First power priority | Msg1 PRACH in a primary cell or MsgA PRACH (in the primary cell) |
| Second power priority | PUCCH including a HARQ-ACK and/or an SR, PUSCH including a HARQ-ACK, MsgA PUSCH including a HARQ-ACK in the primary cell, or PUR PUSCH including a HARQ-ACK in the primary cell |
| Third power priority | PUCCH including CSI, PUSCH including CSI, MsgA PUSCH including CSI in the primary cell, or PUR PUSCH including CSI in the primary cell |
| Fourth power priority | PUSCH excluding a HARQ-ACK or CSI, MsgA PUSCH excluding a HARQ-ACK or CSI in the primary cell, or PUR PUSCH excluding a HARQ-ACK or CSI in the primary cell |
| Fifth power priority | SRS (where an aperiodic SRS has a higher priority than a periodic SRS or semi-persistent SRS), Msg1 PRACH in a non-primary cell, MsgA PUSCH in the non-primary cell, or PUR PUSCH in the non-primary cell |

When power adjustment is performed according to the priority sequence in Table 2, because the PUCCH with the second power priority and a current PUSCH have relatively high power priorities, a downlink transmission throughput can be ensured as much as possible.

In another embodiment, this application provides power priorities of different uplink signals and a sequence of the power priorities, as shown in Table 3.

TABLE 3

| | |
|---|---|
| First power priority | Msg1 PRACH or MsgA PRACH in a primary cell |
| Second power priority | PUCCH including a HARQ-ACK and/or an SR, PUSCH including a HARQ-ACK, MsgA PUSCH including a HARQ-ACK, or PUR PUSCH including a HARQ-ACK |
| Third power priority | PUCCH including CSI, PUSCH including CSI, MsgA PUSCH including CSI, or PUR PUSCH including CSI |
| Fourth power priority | PUSCH excluding a HARQ-ACK or CSI, MsgA PUSCH excluding a HARQ-ACK or CSI, or PUR PUSCH excluding a HARQ-ACK or CSI |
| Fifth power priority | SRS (where an aperiodic SRS has a higher priority than a periodic SRS or a semi-persistent SRS), or Msg1 PRACH in a non-primary cell |

In another embodiment, this application provides power priorities of different uplink signals and a sequence of the power priorities, as shown in Table 4.

TABLE 4

| | |
|---|---|
| First power priority | Msg1 PRACH in a primary cell, contention-based MsgA PUSCH, or contention-based PUR PUSCH |
| Second power priority | PUCCH including a HARQ-ACK and/or an SR, PUSCH including a HARQ-ACK, MsgA PUSCH including a HARQ-ACK, or PUR PUSCH including a HARQ-ACK |
| Third power priority | PUCCH including CSI, PUSCH including CSI, MsgA PUSCH including CSI, or PUR PUSCH including CSI |
| Fourth power priority | PUSCH excluding a HARQ-ACK or CSI, non-contention-based MsgA PUSCH, or non-contention-based PUR PUSCH |

TABLE 4-continued

| | |
|---|---|
| Fifth power priority | SRS (where an aperiodic SRS has a higher priority than a periodic SRS or a semi-persistent SRS), or Msg1 PRACH in a non-primary cell |

In the foregoing tables 1 to 4, the first power priority, the second power priority, the third power priority, the fourth power priority, and the fifth power priority are in descending order. The terminal device may determine, based on a type of each uplink signal, a priority corresponding to each uplink signal.

In another embodiment, the network device may send configuration information to the terminal device, where the configuration information is used to configure power priorities of various types of uplink signals.

When performing random access by using the two-step random access procedure, the terminal device retransmits a MsgA if previous random access fails. During the retransmission, a transmit power of a MsgA PRACH and/or a MsgA PUSCH may be ramped, to increase an access success probability. When the MsgA needs to be retransmitted, for a method for determining the transmit powers of the MsgA PRACH and the MsgA PUSCH, refer to related descriptions in any embodiment of this application. A value on a power ramping counter needs to be used to determine the transmit powers of MsgA PRACH and the MsgA PUSCH.

In an implementation, a same power ramping counter is used for the MsgA PRACH and the MsgA PUSCH. Compared with a transmit beam of the MsgA PRACH or the MsgA PUSCH in the previous transmission, if a transmit beam of the MsgA PRACH or the MsgA PUSCH in the current transmission changes, the power ramping counter is interrupted (a value on the power ramping counter of the terminal remains unchanged). In this case, the terminal device interrupts power ramping of the MsgA PRACH and the MsgA PUSCH, so that unnecessary interference can be reduced. In a CA/DC/SUL scenario, if the terminal device needs to reduce the transmit power of the MsgA PRACH and/or the MsgA PUSCH, the terminal device interrupts the power ramping counter for the MsgA PRACH and the MsgA PUSCH, to save the transmit power of the terminal.

In another implementation, different power ramping counters are used for the MsgA PRACH and the MsgA PUSCH. Compared with a transmit beam of the MsgA in the previous transmission, if a transmit beam of the MsgA PRACH in the current transmission changes, the terminal device interrupts a power ramping counter corresponding to the MsgA PRACH. In a CA/DC/SUL scenario, if the terminal device needs to reduce the transmit power of the MsgA PRACH or does not send the MsgA PRACH, the terminal device interrupts the power ramping counter corresponding to the MsgA PRACH. Compared with a transmit beam of the MsgA in the previous transmission, if a transmit beam of the MsgA PUSCH in the current transmission changes, the terminal device interrupts a power ramping counter corresponding to the MsgA PUSCH. In a CA/DC/SUL scenario, if the terminal device needs to reduce the transmit power of the MsgA PUSCH or does not send the MsgA PUSCH, the terminal device interrupts the power ramping counter corresponding to the MsgA PUSCH.

In the two-step random access procedure, if the network device detects the MsgA PRACH, but does not detect the MsgA PUSCH or does not correctly decode the MsgA PUSCH, the network device may send a MsgB to the terminal device to indicate the terminal device to retransmit a PUSCH. In view of this, this application provides a method for determining a transmit power of a retransmitted PUSCH. The method is the same as the method for determining a transmit power of a retransmitted MsgA PUSCH in the other embodiments of this application, but some parameters used to determine the power are different.

In an implementation, the transmit power used to retransmit the PUSCH is determined based on a power difference between a Msg1 PRACH and a Msg3 PUSCH in the four-step random access procedure, a power adjustment amount $\delta_{msgB}$ indicated by a power control command in the MsgB, and the power ramp amount of the Msg A PRACH or the MsgA PUSCH in the two-step random access procedure. For example, $$P_{PUSCH,b,f,c}(i,j) = \min\left(P_{CMAX,f,c},\ P_{O\_PRE} + \Delta_{PREAMBLE\_Msg3} + 10\log_{10}\left(2^{\mu} M_{RB,b,f,c}^{PUSCH}(i)\right) + \alpha_{b,f,c}(j) * PL_c + \Delta_{TF,b,f,c}(i) + \Delta_{rampup,b,f,c} + \delta_{msgB,b,f,c}\right),$$

where $\Delta_{PREAMBLE\_Msg3}$ is the power difference between the Msg1 PRACH and the Msg3 PUSCH in the four-step random access procedure, and a value of $\Delta_{PREAMBLE\_Msg3}$ IS configured by the network device for the terminal device by using signaling; $\Delta_{rampup,b,f,c}$ is the power ramp amount of the Msg A PRACH or the MsgA PUSCH in the two-step random access procedure. For other parameters in the foregoing formula, refer to related descriptions in the foregoing embodiments.

In another implementation, the transmit power used to retransmit the PUSCH is determined based on a power difference between a PRACH and a PUSCH in the two-step random access procedure, a power adjustment amount $\delta_{msgB}$ indicated by a power control command in the MsgB, and the power ramp amount of the Msg A PRACH or the MsgA PUSCH in the two-step random access procedure.

$$P_{PUSCH,b,f,c}(i,j) = \min\left(P_{CMAX,f,c},\ P_{O\_PRE} + \Delta_{MsgA\_PUSCH} + 10\log_{10}\left(2^{\mu} M_{RB,b,f,c}^{PUSCH}(i)\right) + \alpha_{b,f,c}(j) PL_c + \Delta_{TF,b,f,c}(i) + \Delta_{rampup,b,f,c} + \delta_{msgB,b,f,c}\right),$$

where $\Delta_{MsgA\_PUSCH}$ is the power difference between the PRACH and the PUSCH in the two-step random access procedure, and $\Delta_{rampup,b,f,c}$ is the power ramp amount of the Msg A PRACH or the MsgA PUSCH in the two-step random access procedure. For other parameters in the foregoing formula, refer to related descriptions in the foregoing embodiments.

In the foregoing two implementations, $\Delta_{rampup,b,f,c}$ may be the same as $\Delta P'_{rampup,b,f,c}$ in the foregoing embodiments. In this case, in the foregoing formula for calculating $\Delta P'_{rampup,b,f,c}$, a value of $\gamma_{pro}$ is 1 or there is no "$\gamma_{pro}$", and a value of $\omega_{preseent}$ is 0 or there is no" $\omega_{preseent}$". In this embodiment, the random access preamble ramp power may be equal to the value on the power ramping counter corresponding to the MsgA PRACH multiplied by a preamble power ramp step of the MsgA, and the reference ramp power may be equal to the value on the power ramping counter corresponding to the MsgA PUSCH multiplied by the PUSCH power ramp step. The value on the power ramping counter corresponding to the MsgA PRACH is a value on the power ramping counter corresponding to the MsgA PRACH in the previous transmission, and the value on the power ramping counter corresponding to the MsgA PUSCH is a value on the power ramping counter corresponding to the MsgA PUSCH in the previous transmission.

The terminal device retransmits the PUSCH based on the transmit power determined in the implementations and the uplink grant carried in the MsgB.

Figure 4:
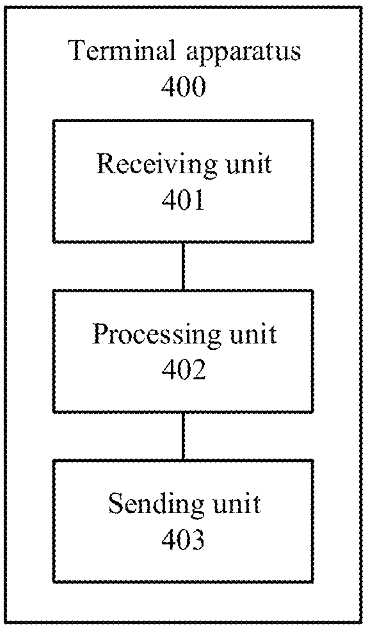
FIG. 4 is a structural block diagram of a terminal device according to an embodiment of this application.

FIG. 4 is a structural block diagram of a terminal device according to an embodiment of this application. The terminal device 400 shown in FIG. 4 may include a receiving unit 401, a processing unit 402, and a sending unit 403.

The receiving unit 401 is configured to receive a broadcast message that is sent by an access network device and that carries first power control information, where the first power control information is used to determine an MCS compensation factor.

The processing unit 402 is configured to determine the MCS compensation factor based on the first power control information.

The processing unit 402 is further configured to determine a first candidate uplink transmit power based on the MCS compensation factor.

The processing unit 402 is further configured to determine a smaller value in the first candidate uplink transmit power and a second candidate uplink transmit power as a physical uplink shared channel PUSCH transmit power.

The sending unit 403 is configured to send PUSCH information in a random access message based on the PUSCH transmit power.

The processing unit 402 may be implemented by a processor. The receiving unit 401 and the sending unit 403 may be implemented by a transceiver. For specific functions and beneficial effects of the receiving unit 401, the processing unit 402, and the sending unit 403, refer to the descriptions in the foregoing method embodiments. Details are not described herein again.

Figure 5:
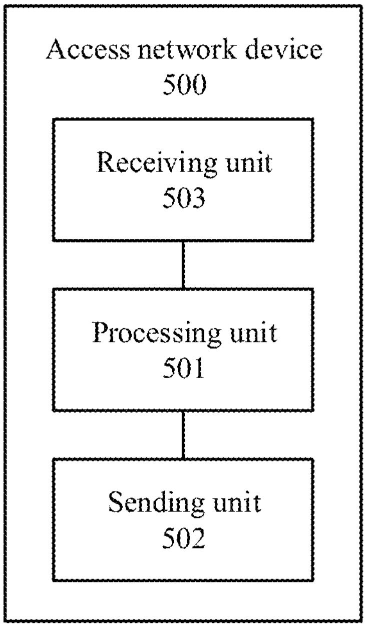
FIG. 5 is a structural block diagram of an access network device according to this application.

FIG. 5 is a structural block diagram of an access network device according to this application. The access network device 500 shown in FIG. 5 may include a processing unit 501 and a sending unit 502.

The processing unit 501 is configured to determine first power control information.

The sending unit 502 is configured to send a broadcast message, where the broadcast message carries the first power control information.

Optionally, the access network device may further include a receiving unit 503. The receiving unit 503 may be configured to receive a random access message sent by a terminal device. The processing unit 501 may be implemented by a processor, and the sending unit 502 and the receiving unit 503 may be implemented by a transceiver. For specific functions and beneficial effects of the processing unit 501, the sending unit 502, and the receiving unit 503, refer to the descriptions in the foregoing method embodiments. Details are not described herein again.

Figure 6:
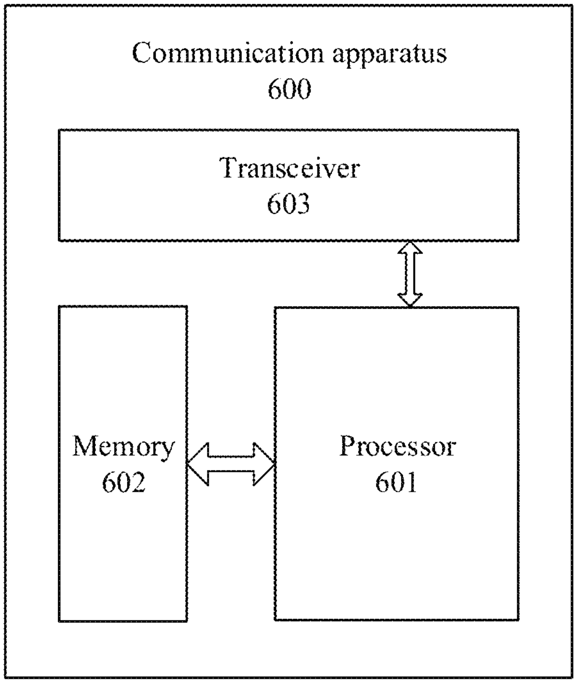
FIG. 6 is a structural block diagram of a communication apparatus according to an embodiment of this application.

FIG. 6 is a structural block diagram of a communication apparatus according to an embodiment of this application. The communication apparatus 600 shown in FIG. 6 includes a processor 601. The processor 601 may be configured to: process a communication protocol and communication data, control the communication apparatus, execute a software program, process data of the software program, and so on.

Optionally, the communication apparatus 600 may further include a memory 602. The memory 602 is mainly configured to store the software program and data.

Optionally, the communication apparatus 600 may further include a transceiver 603. The transceiver may also be referred to as a transceiver unit, a transceiver machine, a transceiver apparatus, or the like. Optionally, a component that is in the transceiver 603 and that is configured to implement a receiving function may be considered as a receiving unit, and a component that is in the transceiver 603 and that is configured to implement a sending function may be considered as a sending unit. In other words, the transceiver 603 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

Optionally, the communication apparatus 600 may be a terminal device or an apparatus (for example, a chip or a circuit) used for the terminal device.

If the communication apparatus 600 is a terminal device, the terminal device may further include a radio frequency circuit and an antenna. The radio frequency circuit is mainly configured to: perform conversion between a baseband signal and a radio frequency signal, and process the radio frequency signal. The antenna is mainly configured to receive and send a radio frequency signal in a form of an electromagnetic wave. An antenna and a radio frequency circuit that have receiving and sending functions may be considered as the transceiver 603 of the terminal device.

If the communication apparatus 600 is an apparatus (for example, a chip or a circuit) used for a terminal device, the communication apparatus may further include an input/output interface. The input/output interface may be configured to: obtain data, and send the obtained data to the processor 601 and/or the memory 602. The input/output interface may be further configured to send the data generated by the processor 601 to another apparatus.

For ease of description, FIG. 6 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in the embodiments of this application.

The processor 601, the memory 602, and the transceiver 603 communicate with each other through an internal connection path, to transfer a control signal and/or a data signal.

The methods disclosed in the foregoing embodiments of the present invention may be applied to the processor 601, or implemented by the processor 601. The processor 601 may be an integrated circuit chip, and has a signal processing capability. In an implementation process, the steps in the foregoing methods may be implemented by using a hardware integrated logic circuit in the processor 601, or by using instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, any conventional processor, or the like. The steps of the methods disclosed with reference to the embodiments of the present invention may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 602 may store instructions used to perform the method performed by the terminal in the foregoing methods. The processor 601 may execute the instructions stored in the memory 602, to complete, in combination with other hardware (for example, the transceiver 603), the steps performed by the terminal device in the foregoing methods. For a specific working process and beneficial effects of the processor 601, refer to the descriptions in the foregoing method embodiments.

If the memory 602 is not disposed in the communication apparatus 600, the processor 601 may be coupled to a memory that stores instructions used to perform a method performed by the terminal device in the foregoing methods.

An embodiment of this application further provides a chip, where the chip includes a transceiver unit and a processing unit. The transceiver unit may be an input/output circuit or a communication interface. The processing unit is a processor, a microprocessor, or an integrated circuit integrated on the chip. The chip may perform a method performed by a terminal device in the foregoing method embodiments.

An embodiment of this application further provides a computer-readable storage medium, where the computer-readable storage medium stores instructions, and when the instructions are executed, a method performed by a terminal device in the foregoing method embodiments is performed.

An embodiment of this application further provides a computer program product including instructions, where when the instructions are executed, a method performed by a terminal device in the foregoing method embodiments is performed.

Figure 7:
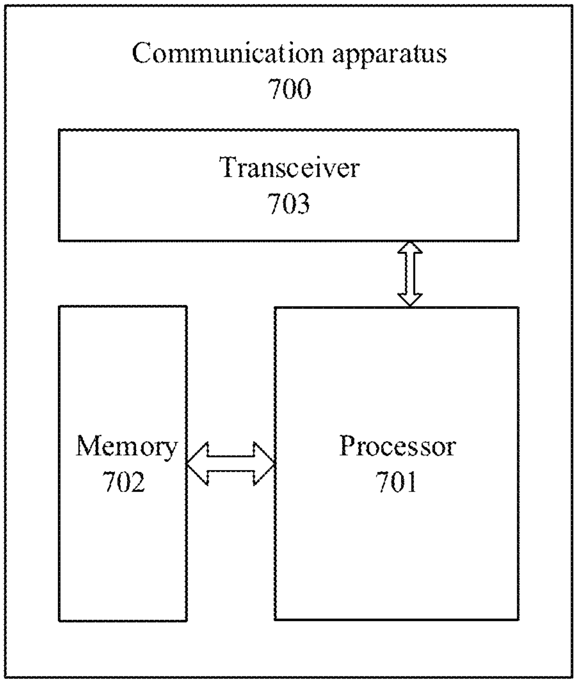
FIG. 7 is a structural block diagram of a communication apparatus according to an embodiment of this application.

FIG. 7 is a structural block diagram of a communication apparatus according to an embodiment of this application. The communication apparatus 700 shown in FIG. 7 includes a processor 701. The processor 701 may be configured to: process a communication protocol and communication data, control the communication apparatus, execute a software program, process data of the software program, and so on.

Optionally, the communication apparatus 700 may further include a memory 702. The memory 702 is mainly configured to store a software program and data.

Optionally, the communication apparatus 700 may further include a transceiver 703. The transceiver may also be referred to as a transceiver unit, a transceiver machine, a transceiver apparatus, or the like. Optionally, a component that is in the transceiver 703 and that is configured to implement a receiving function may be considered as a receiving unit, and a component that is in the transceiver 703 and that is configured to implement a sending function may be considered as a sending unit. In other words, the transceiver 703 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

Optionally, the communication apparatus 700 may be an access network device or an apparatus (for example, a chip or a circuit) used for the access network device.

If the communication apparatus 700 is an access network device, the access network device may further include a radio frequency circuit and an antenna. The radio frequency circuit is mainly configured to: perform conversion between a baseband signal and a radio frequency signal, and process the radio frequency signal. The antenna is mainly configured to receive and send a radio frequency signal in a form of an electromagnetic wave. An antenna and a radio frequency circuit that have receiving and sending functions may be considered as the transceiver 703 of the access network device.

If the communication apparatus 700 is an apparatus (for example, a chip or a circuit) used for an access network device, the communication apparatus may further include an input/output interface. The input/output interface may be configured to: obtain data, and send the obtained data to the processor 701 and/or the memory 702. The input/output interface may be further configured to send the data generated by the processor 701 to another apparatus.

For ease of description, FIG. 7 shows only one memory and one processor. In an actual product, there may be one or more processors and one or more memories. The memory may also be referred to as a storage medium, a storage device, or the like. The memory may be disposed independent of the processor, or may be integrated with the processor. This is not limited in the embodiments of this application.

The processor 701, the memory 702, and the transceiver 703 communicate with each other through an internal connection path, to transfer a control signal and/or a data signal.

The method disclosed in the foregoing embodiments of the present invention may be applied to the processor 701, or implemented by the processor 701. The processor 701 may be an integrated circuit chip, and has a signal processing capability. In an implementation process, the steps in the foregoing methods may be implemented by using a hardware integrated logic circuit in the processor 701, or by using instructions in a form of software.

The processor in the embodiments of this application may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, any conventional processor, or the like. The steps of the methods disclosed with reference to the embodiments of the present invention may be directly performed by a hardware decoding processor, or may be performed by using a combination of hardware and software modules in a decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and the processor reads the instructions from the memory and completes the steps of the foregoing methods in combination with hardware in the processor.

Optionally, in some embodiments, the memory 702 may store instructions used to perform the method performed by the access network device in the foregoing methods. The processor 701 may execute the instructions stored in the memory 702, to complete, in combination with other hardware (for example, the transceiver 703), the steps performed by the access network device in the foregoing methods. For a specific working process and beneficial effects, refer to the descriptions in the foregoing method embodiments.

If the memory 702 is not disposed in the communication apparatus 700, the processor 701 may be coupled to a memory that stores instructions used to perform a method performed by the access network device in the foregoing methods.

An embodiment of this application further provides a chip, where the chip includes a transceiver unit and a processing unit. The transceiver unit may be an input/output circuit or a communication interface. The processing unit is a processor, a microprocessor, or an integrated circuit integrated on the chip. The chip may perform the method performed by the access network device in the foregoing method embodiments.

An embodiment of this application further provides a computer-readable storage medium, where the computer-readable storage medium stores instructions, and when the instructions are executed, a method performed by an access network device in the foregoing method embodiments is performed.

An embodiment of this application further provides a computer program product including instructions, where when the instructions are executed, a method performed by an access network device in the foregoing method embodiments is performed.

A person of ordinary skill in the art may be aware that units, algorithms, and steps in the examples described with reference to the embodiments disclosed in this specification can be implemented by electronic hardware or a combination of computer software and electronic hardware. Whether the functions are performed in a manner of hardware or software depends on a particular application and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

determining a total transmit power of a first plurality of uplink signals located in a first time domain resource, wherein the first plurality of uplink signals include message A (MsgA) physical random access channel (PRACH);

when the total transmit power of the first plurality of uplink signals exceeds a maximum transmit power of a terminal device, determining a transmit power of the MsgA PRACH based on a power priority of the MsgA PRACH, wherein the power priority of the MsgA PRACH is same as a power priority of message 1 (Msg 1) PRACH in a primary cell.

2. The method according to claim 1, wherein the method further comprises:

when a total transmit power of a second plurality of uplink signals located in a second time domain resource exceeds the maximum transmit power of the terminal device, determining a transmit power of a MsgA physical uplink shared channel (PUSCH) based on the power priority of the MsgA PRACH, wherein the second plurality of uplink signals include the MsgA PUSCH, and a power priority of the MsgA PUSCH is same as a power priority of a PUSCH excluding a hybrid automatic repeat request (HARQ)-ACK or channel state information (CSI).

3. The method according to claim 2, wherein the power priority of the Msg 1 PRACH in a primary cell is higher than the power priority of the PUSCH excluding a HARQ-ACK or CSI.

4. A communication apparatus, comprising:

at least one processor configured with processor-executable instructions to perform operations comprising:

determining a total transmit power of a first plurality of uplink signals located in a first time domain resource, wherein the first plurality of uplink signals include MsgA PRACH;

when the total transmit power of the first plurality of uplink signals exceeds a maximum transmit power of a terminal device, determining a transmit power of the MsgA PRACH based on a power priority of the MsgA PRACH, wherein the power priority of the MsgA PRACH is same as a power priority of Msg 1 PRACH in a primary cell.

5. The communication apparatus according to claim 4, wherein the at least one processor is further configured with processor-executable instructions to perform operations comprising:

when a total transmit power of a second plurality of uplink signals located in a second time domain resource exceeds the maximum transmit power of the terminal device, determining a transmit power of a MsgA PUSCH based on the power priority of the MsgA PRACH, wherein the second plurality of uplink signals include the MsgA PUSCH, and a power priority of the MsgA PUSCH is same as a power priority of a PUSCH excluding a HARQ-ACK or CSI.

6. The communication apparatus according to claim 5, wherein the power priority of the Msg 1 PRACH in a primary cell is higher than the power priority of the PUSCH excluding a HARQ-ACK or CSI.

7. The communication apparatus according to claim 4, wherein the communication apparatus is a chip.

8. A non-transitory computer-readable storage medium storing computer instructions, that when executed by at least one processor, cause the at least one processor to perform operations comprising:

determining a total transmit power of a first plurality of uplink signals located in a first time domain resource, wherein the first plurality of uplink signals include MsgA PRACH;

when the total transmit power of the first plurality of uplink signals exceeds a maximum transmit power of a terminal device, determining a transmit power of the MsgA PRACH based on a power priority of the MsgA PRACH, wherein the power priority of the MsgA PRACH is same as a power priority of Msg 1 PRACH in a primary cell.

9. The non-transitory computer-readable storage medium according to claim 8, wherein the non-transitory computer-readable storage medium, when executed by the at least one processor, further cause the at least one processor to perform operations comprising:

when a total transmit power of a second plurality of uplink signals located in a second time domain resource exceeds the maximum transmit power of the terminal device, determining a transmit power of a MsgA PUSCH based on the power priority of the MsgA PRACH, wherein the second plurality of uplink signals include the MsgA PUSCH, and a power priority of the MsgA PUSCH is same as a power priority of a PUSCH excluding a HARQ-ACK or CSI.

10. The non-transitory computer-readable storage medium according to claim 9, wherein the power priority of the Msg 1 PRACH in a primary cell is higher than the power priority of the PUSCH excluding a HARQ-ACK or CSI.

* * * * *